United States Patent
Moon et al.

(10) Patent No.: US 12,221,823 B2
(45) Date of Patent: Feb. 11, 2025

(54) DAMPER FOR GLOVE BOX AND GLOVE BOX HAVING THE SAME

(71) Applicants: HYUNDAI MOBIS CO., LTD., Seoul (KR); PIOLAX CO., LTD., Incheon (KR)

(72) Inventors: Yong Gon Moon, Yongin-si (KR); Hak Young Kim, Yongin-si (KR); Kyung Joo Song, Incheon (KR)

(73) Assignees: Hyundai Mobis Co., Ltd., Seoul (KR); PIOLAX CO., LTD., Incheon (KR)

( * ) Notice: Subject to any disclaimer, the term of this patent is extended or adjusted under 35 U.S.C. 154(b) by 369 days.

(21) Appl. No.: 17/863,611

(22) Filed: Jul. 13, 2022

(65) Prior Publication Data
US 2023/0304341 A1    Sep. 28, 2023

(30) Foreign Application Priority Data

Mar. 28, 2022   (KR) ........................ 10-2022-0038028

(51) Int. Cl.
*E05F 3/02* (2006.01)
*B60R 7/06* (2006.01)

(52) U.S. Cl.
CPC .................. *E05F 3/02* (2013.01); *B60R 7/06* (2013.01); *E05Y 2201/21* (2013.01); *E05Y 2900/538* (2013.01)

(58) Field of Classification Search
CPC ...... E05F 3/02; E05F 5/02; B60R 7/06; E05Y 2201/21; E05Y 2900/538; E05Y 2201/234; E05Y 2201/25; E05Y 2201/256; E05Y 2201/264; E05Y 2201/412; F16F 9/446; F16F 9/342; F16F 9/0218; F16F 9/34; F16F 9/512; F16F 13/007

See application file for complete search history.

(56) References Cited

U.S. PATENT DOCUMENTS

2023/0311778 A1\*  10/2023  Moon ....................... E05F 5/10
                                                              296/37.12

FOREIGN PATENT DOCUMENTS

JP           5-58996 U       8/1993
JP        2011-69424 A       4/2011

OTHER PUBLICATIONS

English Translation of JP2011069424A (Year: 2011).\*
English Translation of JPH0558996U (Year: 1993).\*
Korean Office Action issued on Oct. 27, 2023, in counterpart Korean Patent Application No. 10-2022-0038028 (5 pages in Korean).

\* cited by examiner

*Primary Examiner* — Lori Lyjak
(74) *Attorney, Agent, or Firm* — NSIP Law

(57) ABSTRACT

A damper for a glove box includes a cylinder including a cylinder body defining a space therein, a partition that divides the space into a first space and a second space and in which a hole is disposed, and guide holes disposed in the cylinder body to communicate with the second space, a piston disposed in the first space to be movable in a first direction, a valve disposed in the second space, and an elastic support unit disposed in the second space to elastically support the valve. The guide holes include a first guide hole and a second guide hole disposed apart from each other along a circumference of the cylinder body, and a protrusion of the valve is disposed in one of the first guide hole and the second guide hole.

18 Claims, 24 Drawing Sheets

DAMPER FOR GLOVE BOX AND GLOVE BOX HAVING THE SAME

CROSS-REFERENCE TO RELATED APPLICATION

This application claims priority to and the benefit of Korean Patent Application No. 10-2022-0038028, filed on Mar. 28, 2022, the disclosure of which is incorporated herein by reference in its entirety.

BACKGROUND

1. Field of the Invention

The present invention relates to a damper for a glove box and a glove box including the same used in a vehicle. Specifically, the present invention relates to a damper for a glove box which controls opening and closing speeds of a glove box and a glove box including the same.

2. Discussion of Related Art

Generally, a glove box for accommodating simple objects is disposed in a dashboard or instrument panel of a vehicle. In this case, the glove box is generally disposed in front of a passenger's seat.

A cover opens or closes an inner space of the glove box to accommodate objects therein. A damper is installed to prevent rapid movement of the cover when the inner space is opened or closed.

The damper includes a cylinder and a piston, and as necessary, a valve can be installed at one side of the cylinder in order to control a speed of the piston.

However, when a load applied to the cover of the glove box increases due to a weight of objects loaded therein or a weight of the cover, the conventional damper has a problem that an opening speed of the glove box cannot be controlled.

Accordingly, a glove box providing a feeling of a constant speed of opening a cover even with a change in load is required.

SUMMARY OF THE INVENTION

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

The present invention is directed to providing a damper for a glove box capable of moving a cover of a glove box at a constant speed within a predetermined range regardless of a load applied to the glove box.

Objectives to be solved by the present invention are not limited to the above-described objectives, and other objectives, which are not described above, will be clearly understood by those skilled in the art from the following description.

In one general aspect, a damper for a glove box includes: a cylinder body defining a space therein, a partition that divides the space into a first space and a second space and in which a hole is disposed, and guide holes disposed in the cylinder body to communicate with the second space, a piston disposed in the first space and configured to be movable in a first direction, a valve disposed in the second space, and an elastic support unit disposed in the second space to elastically support the valve. The guide holes include a first guide hole and a second guide hole disposed apart from each other along a circumference of the cylinder body, and a protrusion of the valve is disposed in one of the first guide hole and the second guide hole.

A first separation distance between the partition and the first guide hole may be smaller than a second separation distance between the partition and the second guide hole.

An upper end of the first guide hole may overlap a lower end of the second guide hole in a circumferential direction.

A size of the first guide hole in the first direction may be smaller than a size of the second guide hole in the first direction.

Each of a pair of first guide holes and a pair of second guide holes may be symmetrically disposed in the cylinder body.

The cylinder body may include a third guide hole, a size of the third guide hole in the first direction may be greater than the size of the second guide hole in the first direction, and a third separation distance between the partition and the third guide hole may be greater than the second separation distance.

An upper end of the second guide hole may overlap a lower end of the third guide hole in a circumferential direction.

The partition may include a first plate portion, a second plate portion spaced apart from the first plate portion in the first direction, a connection portion connecting the first plate portion to the second plate portion, and a first protruding portion that protrudes from the second plate portion toward the valve to allow the hole to extend.

The first protruding portion may include a groove disposed in an inner side surface thereof.

The groove may have a cross-sectional area that increases toward an end portion of the first protruding portion.

The valve may include a valve body having a plate shape and a second protruding portion that protrudes from the valve body and is disposed in the first protruding portion, and the protrusion may protrude from an outer side surface of the valve body.

The valve may include a third protruding portion that protrudes from the valve body, and the third protruding portion may be disposed between the connection portion and the first protruding portion.

A length of the second protruding portion in the first direction may be greater than a length of the third protruding portion in the first direction.

The elastic support unit may be a coil spring having one side in contact with the valve body and the other side in contact with the first plate portion.

The piston may include a piston body, a rod that protrudes from a lower surface of the piston body in the first direction, and a guide member that protrudes from an upper surface of the piston body in the first direction, and the piston body, the rod, and the guide member may be integral, and the guide member may be disposed between the connection portion and an inner side surface of the cylinder body.

The damper may include a sealing member disposed on an outer side surface of the piston body.

The partition may have a plate shape and the hole may be disposed in a central portion thereof, the valve may include a valve body having a plate shape and a second protruding portion that protrudes from the valve body so that an end portion thereof is disposed in the hole, the second protruding portion may have a cross-sectional area that decreases toward the end portion thereof, and the protrusion may protrude from an outer side surface of the valve body.

The piston may include a piston body and a rod that protrudes from a lower surface of the piston body in the first direction, and the piston body may include a groove corresponding to the second protruding portion.

The elastic support unit may be a coil spring having one side in contact with the valve body and the other side in contact with the partition.

The cylinder may include an inclined surface disposed in the first space, and a cross-sectional area of the first space in which the inclined surface is disposed may decrease away from the partition.

In another general aspect, a glove box includes a glove box body and a cover that define an accommodation space therebetween and a damper for the glove box configured to adjust a movement speed of the glove box body. The glove box body is rotatably disposed in a dashboard of a vehicle, and the damper includes a cylinder including a cylinder body defining a space therein, a partition that divides the space into a first space and a second space and in which a hole is disposed, and guide holes disposed in the cylinder body to communicate with the second space, a piston disposed in the first space and configured to be movable in a first direction, a valve disposed in the second space, and an elastic support unit disposed in the second space to elastically support the valve, the guide holes include a first guide hole and a second guide hole disposed apart from each other along a circumference of the cylinder body, and a protrusion of the valve is disposed in one of the first guide hole and the second guide hole.

A first separation distance between the partition and the first guide hole may be smaller than a second separation distance between the partition and the second guide hole.

The partition may include a first plate portion, a second plate portion spaced apart from the first plate portion in the first direction, a connection portion connecting the first plate portion to the second plate portion, and a first protruding portion that protrudes from the second plate portion toward the valve to allow the hole to extend, and the first protruding portion may include a groove disposed in an inner side surface thereof and the groove may have a cross-sectional area that increases toward an end portion thereof.

The valve may include a valve body having a plate shape and a second protruding portion that protrudes from the valve body to be disposed in the first protruding portion, and the protrusion may protrude from an outer side surface of the valve body.

The partition may have a plate shape and the hole may be formed in a central portion thereof, the valve may include a valve body having a plate shape and a second protruding portion that protrudes from the valve body so that an end portion thereof is disposed in the hole, the second protruding portion may have a cross-sectional area that decreases toward the end portion thereof, and the protrusion may protrude from an outer side surface of the valve body.

Other features and aspects will be apparent from the following detailed description, the drawings, and the claims.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Figure 1:
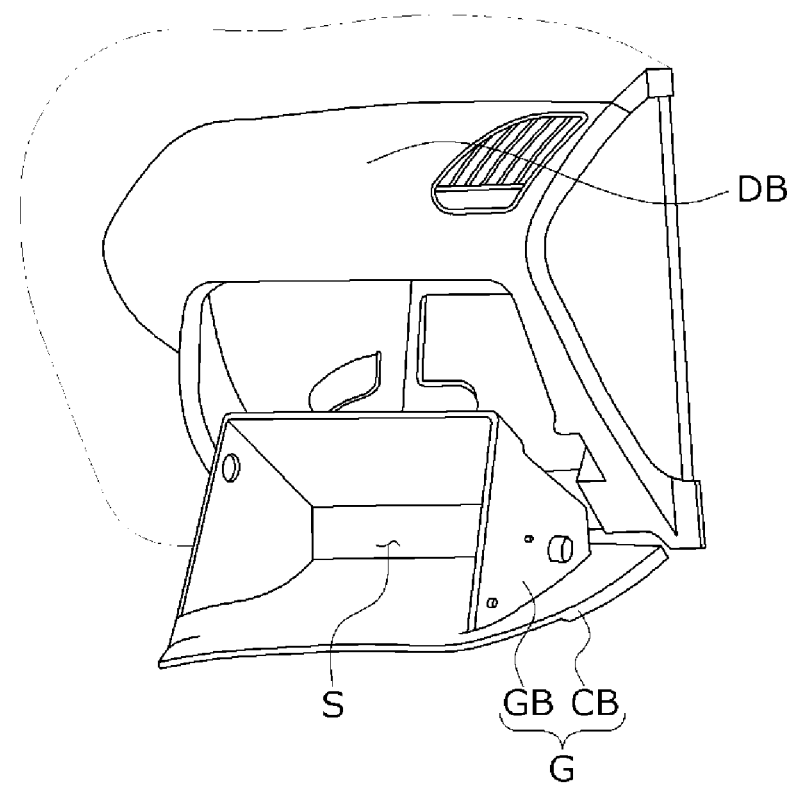
FIG. 1 is a view illustrating a glove box installed in a vehicle.

Since the present invention allows various changes and has many embodiments, specific embodiments will be illustrated in the accompanying drawings and described. However, this is not intended to limit the present invention to the specific embodiments, and it is to be appreciated that all changes, equivalents, and substitutes that fall within the spirit and technical scope of the present invention are encompassed in the present invention.

Although the terms "first," "second," and the like may be used herein to describe various elements, these elements should not be limited by these terms. These terms are only used to distinguish one element from another element. For example, a second element could be termed a first element, and a first element could similarly be termed a second element without departing from the scope of the present invention. The term "and/or" includes any one or any combination among a plurality of associated listed items.

When an element is referred to as being "connected" or "coupled" to another element, it will be understood that the element can be directly connected or coupled to another element, or other elements may be present therebetween. In contrast, when an element is referred to as being "directly connected" or "directly coupled" to another element, it will be understood that there are no intervening elements.

In a description of the embodiment, in a case in which any one element is described as being formed on or under another element, such a description includes both a case in which the two elements are formed in direct contact with each other and a case in which the two elements are in indirect contact with each other with one or more other elements interposed between the two elements. In addition, when one element is described as being formed on or under another element, such a description may include a case in which the one element is formed at an upper side or a lower side with respect to another element.

The terminology used herein is for the purpose of describing particular embodiments only and is not intended to limit the present invention. The singular forms are intended to include the plural forms, unless the context clearly indicates otherwise. In the present specification, it should be further understood that the terms "comprise," "comprising," "include," and/or "including," when used herein, specify the presence of stated features, numbers, steps, operations, elements, and/or components but do not preclude the presence or addition of one or more other features, numbers, steps, operations, elements, components, and/or groups thereof.

Unless otherwise defined, all terms including technical and scientific terms used herein have meanings which are the same as meanings generally understood by those skilled in the art. Terms, such as those defined in commonly used dictionaries, should be interpreted as having meanings that are consistent with their meanings in the context of the relevant art and will not be interpreted in an idealized or overly formal sense unless expressly so defined here.

Hereinafter, when embodiments are described in detail with reference to the accompanying drawings, components that are the same or correspond to each other will be denoted by the same or corresponding reference numerals in all drawings, and redundant descriptions will be omitted.

Figure 2:
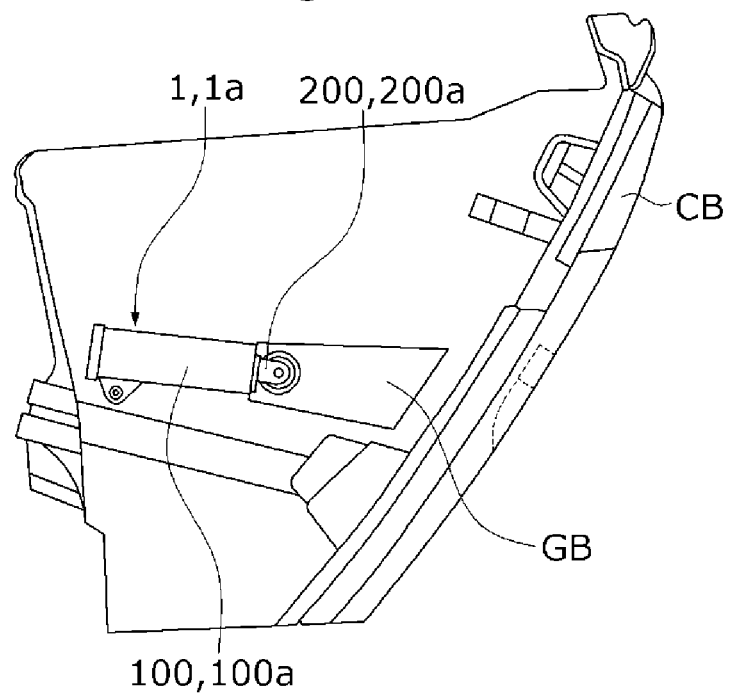
FIG. 2 is a view illustrating a state in which a glove box is closed by a damper for a glove box according to an embodiment.
Figure 3:
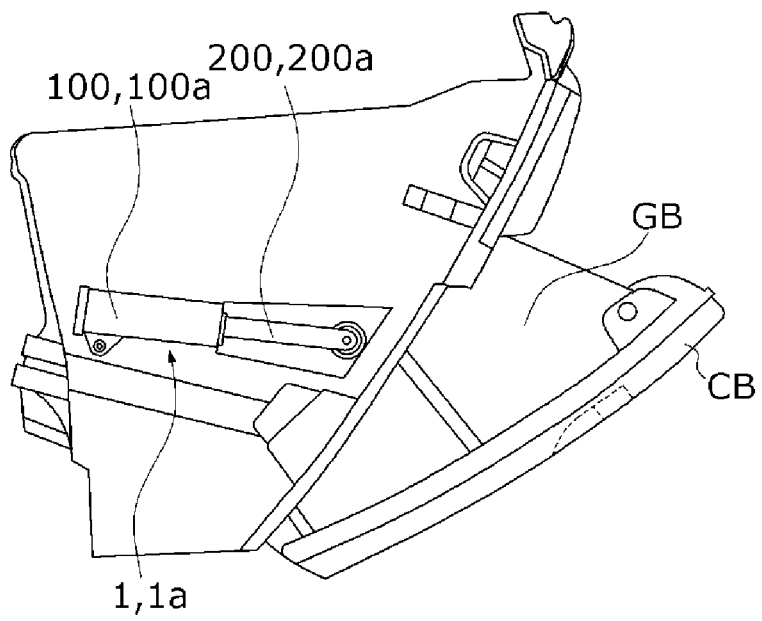
FIG. 3 is a view illustrating a state in which the glove box is opened by the damper for a glove box according to the embodiment.
Figure 4:
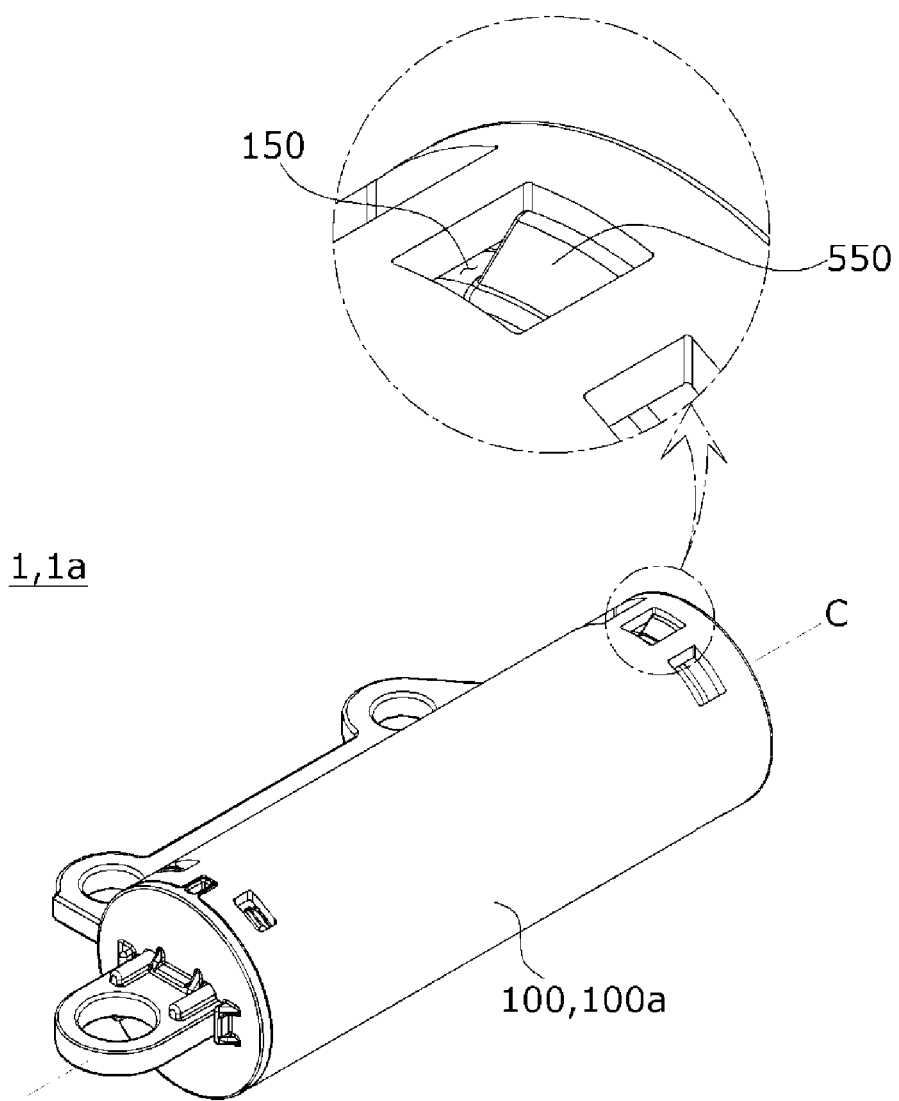
FIG. 4 is a perspective view illustrating the damper for a glove box according to the embodiment.

FIG. 1 is a view illustrating a glove box installed in a vehicle, FIG. 2 is a view illustrating a state in which a glove box is closed by a damper for a glove box according to an embodiment, and FIG. 3 is a view illustrating a state in which the glove box is opened by the damper for a glove box according to the embodiment;

Referring to FIGS. 1 to 3, a glove box G for a vehicle may be installed in a dashboard DB in order to provide a storage space to a passenger aboard a vehicle. For example, in order to arrange the glove box G, a space may be formed in the dashboard DB. In addition, the glove box G may be rotatably disposed in the dashboard DB to open or close the space. In this case, the dashboard DB may be referred to as an instrument panel.

The glove box G may include a glove box body GB and a cover CB forming a storage space S therein and a damper 1 or 1a for a glove box according to the embodiment which controls a movement speed of the cover CB. In this case, the glove box body GB and the cover CB may be integrally formed.

The glove box body GB may be rotatably installed in the dashboard DB.

The cover CB may open or close the space according to rotation of the glove box body GB. In this case, the damper 1 or 1a may control the movement speed of the cover CB. In addition, for smooth rotation of the cover CB, a cylinder 100 or 100a of the damper 1 or 1a may be hinge-coupled to the dashboard DB, and a piston 200 or 200a of the damper 1 or 1a may be hinge-coupled to the glove box G. In this case, the damper 1 or 1a may be an air damper using air.

Meanwhile, a rotation speed of the cover CB may be determined by a load (a weight of the cover+a weight of an object accommodated in the glove box) applied to the cover CB and a damping force of the damper 1 or 1a. In this case, the damper 1 or 1a may control an opening speed of the cover CB. In this case, the opening speed of the cover CB may be the same as a movement speed of the piston 200 or 200a disposed in the damper 1 or 1a.

Accordingly, even when the load of the glove box G changes, the damper 1 or 1a for a glove box according to the embodiment may control a variable amount of a valve 500 or 500a to prevent the opening speed of the cover CB from changing rapidly due to the change in the load. In this case, the variable amount may be controlled through an elastic support unit, a structure of the damper 1 or 1a which changes a size of an orifice, a coupling structure between the cylinder 100 or 100a and the valve 500 or 500a, and the like. In this case, a pressure difference may be generated between the inside and the outside of the cylinder 100 or 100a due to movement of the piston 200 or 200a, and the valve 500 or 500a may move due to the pressure difference.

Specifically, the damper 1 or 1a may maintain a constant movement speed of the cover CB within a predetermined range regardless of the weight of the object accommodated in the storage space S through the elastic support unit which generates elasticity according to movement of the valve 500 or 500a and elastically supports the valve 500 or 500a, a structure which changes the size of the orifice according to movement of the valve 500 or 500a, and the like.

Various embodiments of the damper 1 or 1a for a glove box may be proposed according to the structure of the cylinder 100 or 100a and the structure and layout of the valve 500 or 500a corresponding to the cylinder 100 or 100a.

First Embodiment

Figure 5:
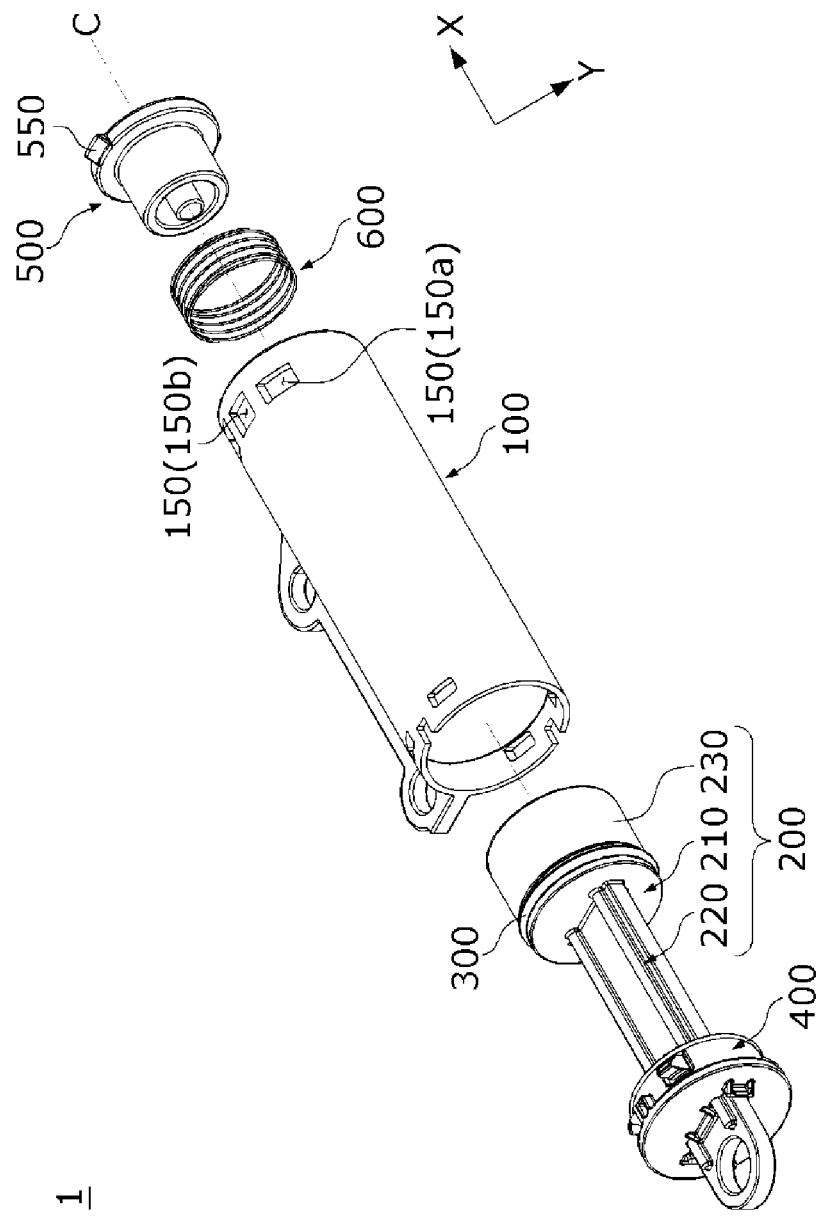
FIG. 5 is an exploded perspective view illustrating a damper for a glove box according to a first embodiment.
Figure 6:
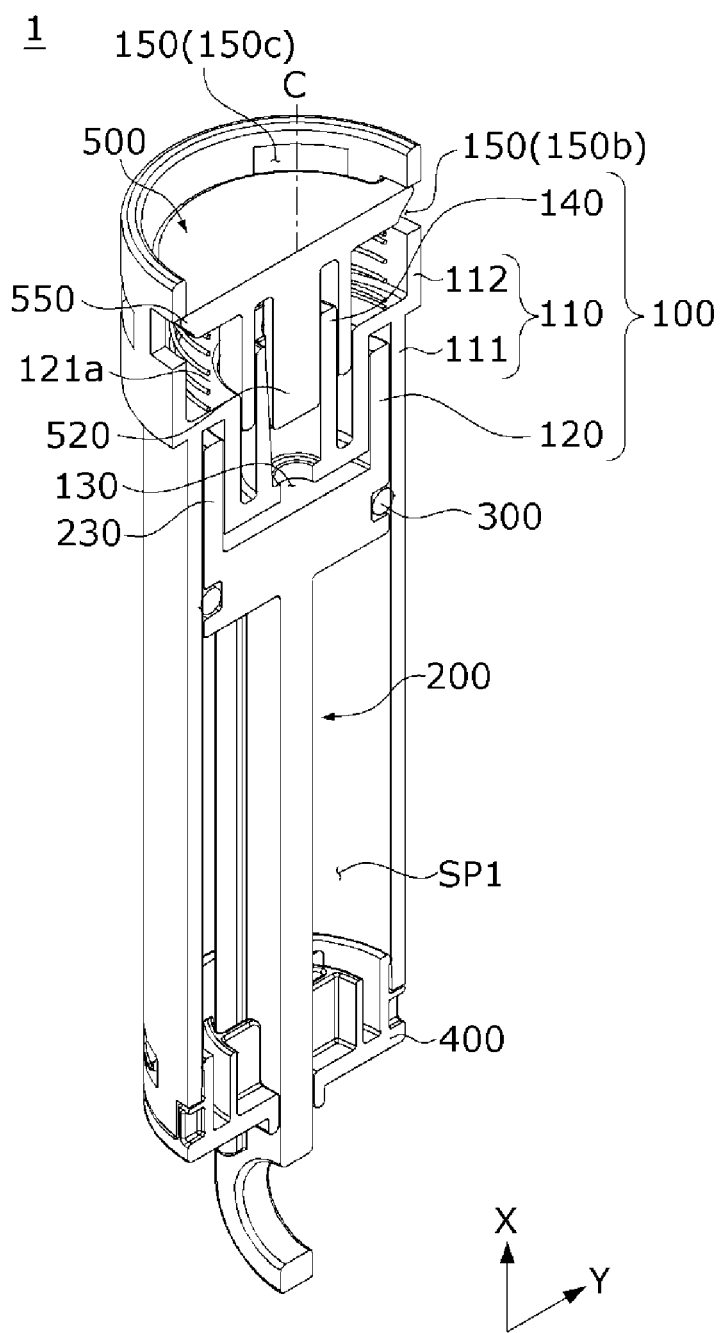
FIG. 6 is a cross-sectional perspective view illustrating the damper for a glove box according to the first embodiment.
Figure 7:
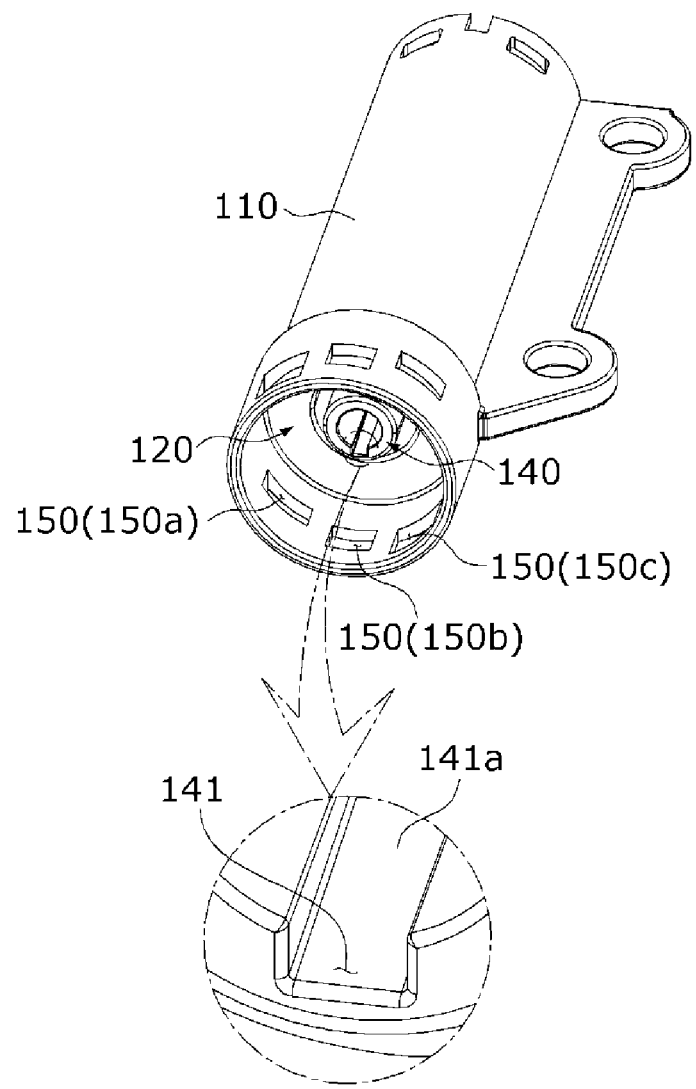
FIG. 7 is a perspective view illustrating a cylinder of the damper for a glove box according to the first embodiment.
Figure 8:
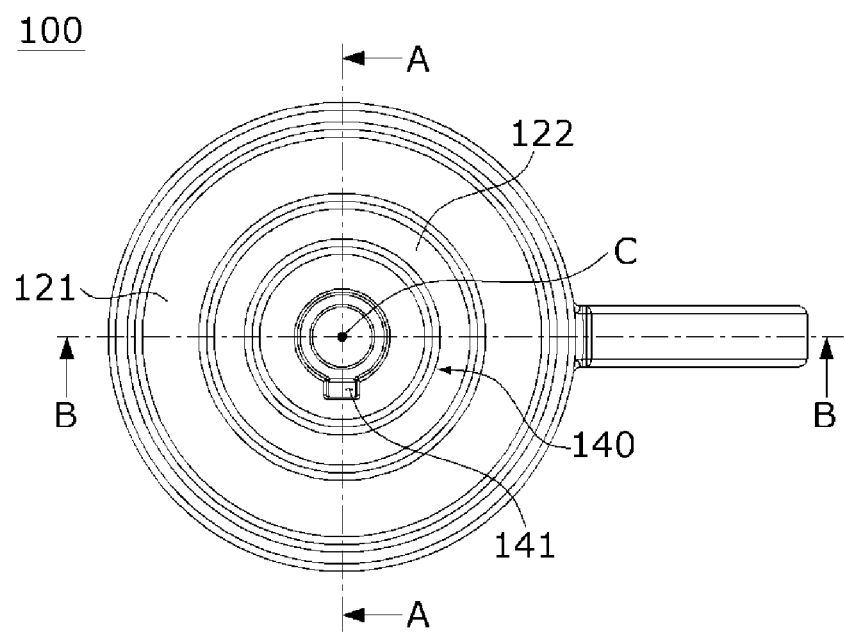
FIG. 8 is a plan view illustrating the cylinder of the damper for a glove box according to the first embodiment.
Figure 9:
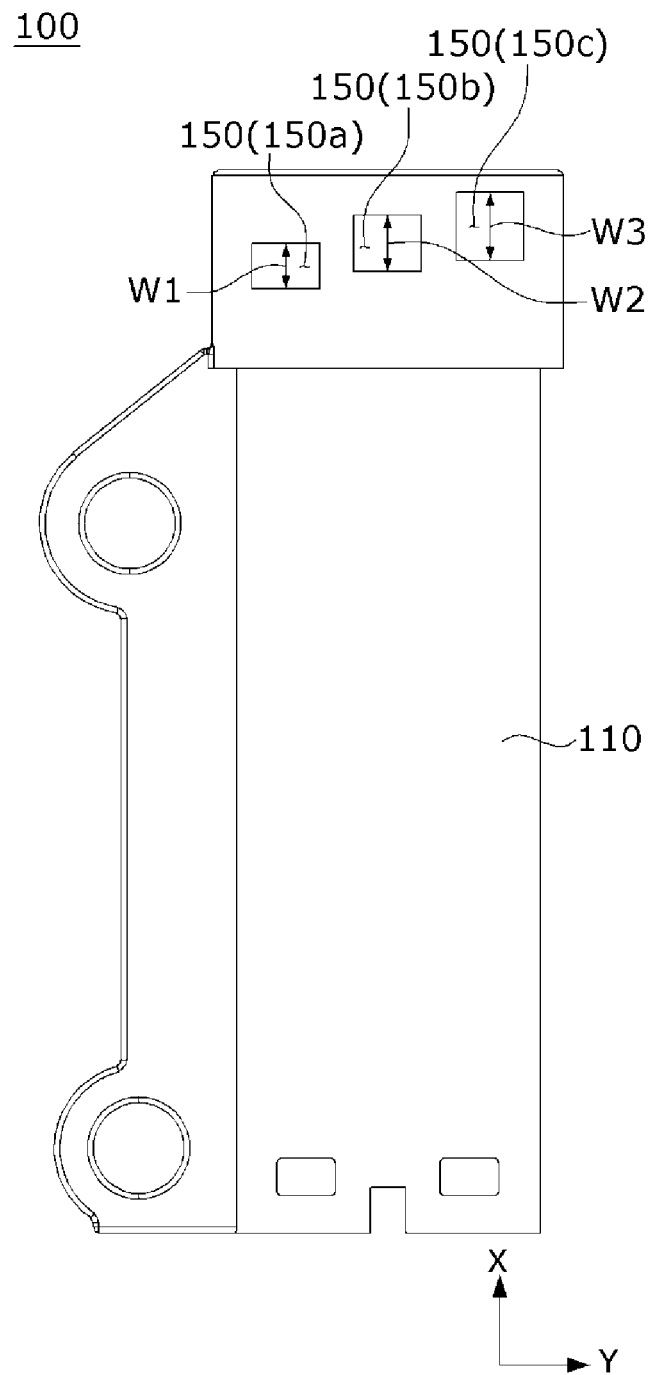
FIG. 9 is a side view illustrating the cylinder of the damper for a glove box according to the first embodiment.
Figure 10:
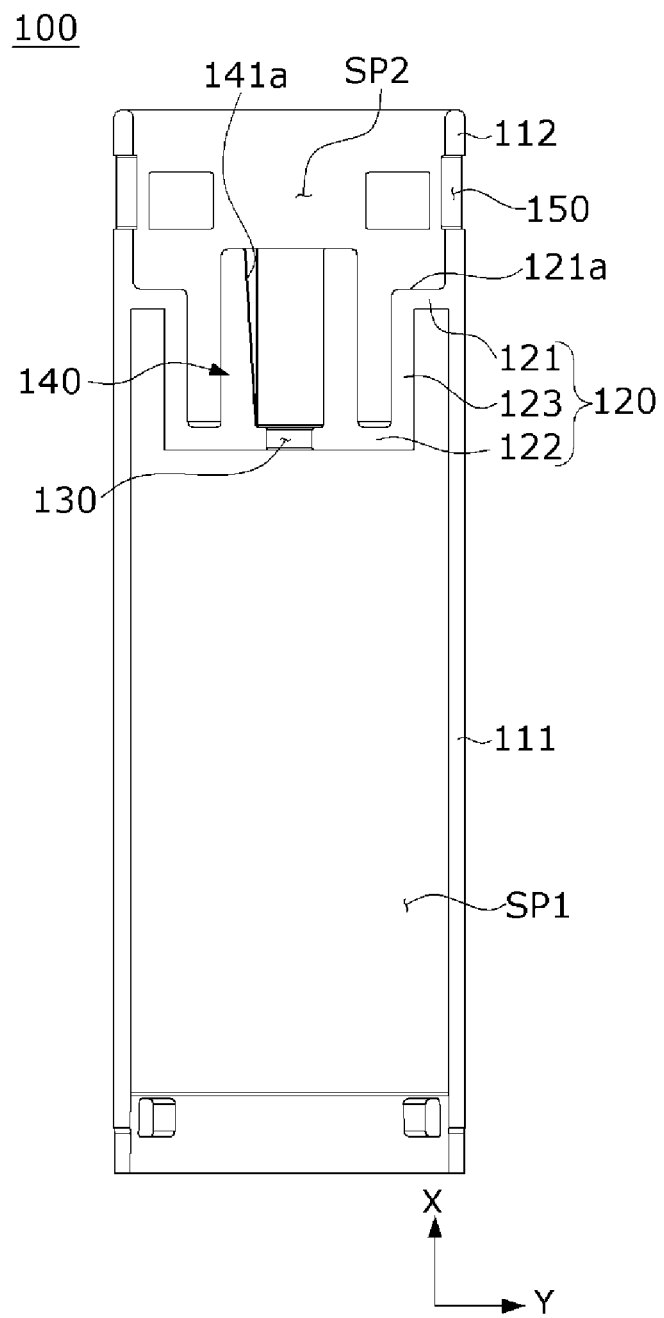
FIG. 10 is a cross-sectional view along line A-A of FIG. 8.
Figure 11:
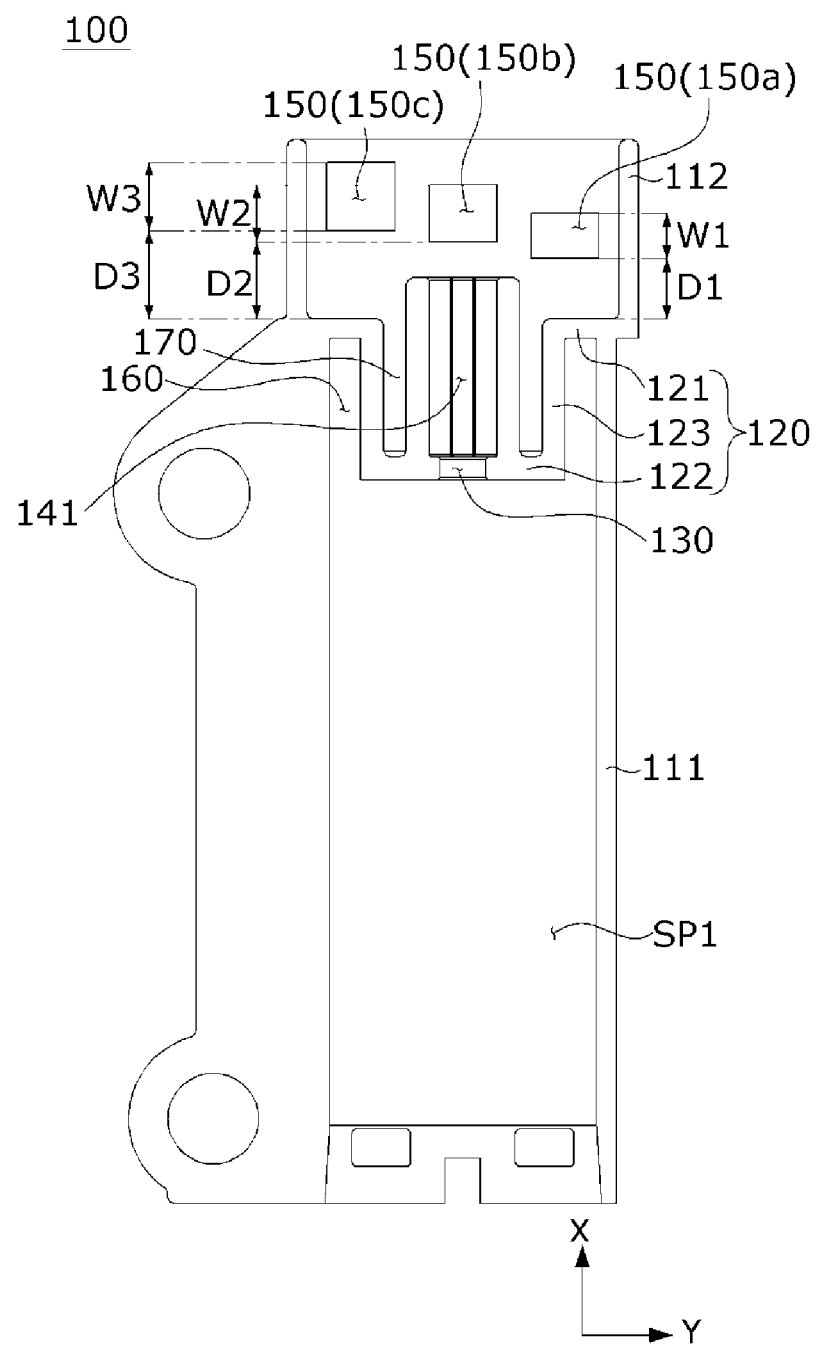
FIG. 11 is a cross-sectional view along line B-B of FIG. 8.

FIG. 5 is an exploded perspective view illustrating a damper for a glove box according to a first embodiment, FIG. 6 is a cross-sectional perspective view illustrating the damper for a glove box according to the first embodiment, FIG. 7 is a perspective view illustrating a cylinder of the damper for a glove box according to the first embodiment, FIG. 8 is a plan view illustrating the cylinder of the damper for a glove box according to the first embodiment, FIG. 9 is a side view illustrating the cylinder of the damper for a glove box according to the first embodiment, FIG. 10 is a cross-sectional view along line A-A of FIG. 8, and FIG. 11 is a cross-sectional view along line B-B of FIG. 8.

In this case, an X direction illustrated in FIGS. 5 and 6 may be a first direction, a movement direction, a longitudinal direction, or a vertical direction in the drawings, and a Y direction may be a radial direction or a horizontal direction in the drawings. In addition, the X direction may be divided into a forward direction in which a glove box G is opened and a rearward direction in which the glove box G is closed. In addition, the X direction and the Y direction may be perpendicular to each other. In addition, a reference symbol "C" may be a center of a damper 1 or valve 500 and may be disposed in the same direction as the X direction.

Referring to FIGS. 5 and 6, the damper 1 according to the first embodiment may include a cylinder 100 having a tubular shape of which openings are formed at one side and the other side, a piston 200 movably disposed at one side of a space formed in the cylinder 100, a sealing member 300 disposed between an inner surface of the cylinder 100 and the piston 200, a cap 400 disposed to cover the opening disposed at one side of the cylinder 100, a valve 500 disposed at the other side of the space, and an elastic support unit 600 which is in contact with a partition 120 of the cylinder 100 and elastically supports the valve 500. In this case, the elastic support unit 600 may be formed as an elastic structure which is pressed while in contact with the partition 120 of the cylinder 100 according to movement of the piston 200.

In addition, the damper 1 allows a protrusion 550 of the valve 500 to be coupled to any one of a plurality of guide holes 150 formed in the cylinder 100 so that the valve 500 may be used for a proper load. In this case, the plurality of guide holes 150 may include a plurality of holes of which sizes and positions are different.

The cylinder 100 may be a rectangular member of which a length in the first direction is greater than a length in a second direction.

In addition, the cylinder 100 may be formed in a circular tubular shape in which openings are formed at one side and the other side and a space is formed.

The cylinder 100 may include a cylinder body 110 in which a space is formed, the partition 120 which divides the space into a first space SP1 and a second space SP2, a first protruding portion 140 formed to protrude from the partition 120 to extend a hole 130 formed in the partition 120, and the plurality of guide holes 150 formed in the cylinder body 110 to allow the second space SP2 and the outside to communicate with each other.

The cylinder body 110 may include a first body 111 and a second body 112 divided by the partition 120. Accordingly, the first space SP1 is disposed in the first body 111, and the second space SP2 is disposed in the second body 112. In this case, the first space SP1 and the second space SP2 may communicate through the hole 130. In addition, the hole 130 may be referred to as a communication hole or orifice.

The partition 120 may be disposed in the cylinder body 110. In addition, the hole 130 may be disposed in a central portion of the partition 120.

The partition 120 may include a first plate portion 121 having a plate shape, a second plate portion 122 disposed apart from the first plate portion in the first direction and having a plate shape, and a connection portion 123 connecting the first plate portion 121 and the second plate portion 122. In this case, the second plate portion 122 may be disposed inward from the first plate portion 121. In this case, the term "inward" may refer to a direction toward a center C in the second direction, and the term "outward" may refer to a direction opposite to "inward."

The first plate portion 121 may be formed in the plate shape and disposed in the second direction. In addition, an outer side of the first plate portion 121 may be connected to the cylinder body 110.

In addition, the first plate portion 121 may be in contact with the elastic support unit 600 to allow the elastic support unit 600 to elastically support the valve 500.

The second plate portion 122 may be formed in the plate shape and disposed apart from the first plate portion 121 in the first direction. Accordingly, a step may be formed between the first plate portion 121 and the second plate portion 122 in the first direction, and due to the step, a space through which the valve 500 moves may expand.

For example, the second plate portion 122 may be disposed closer to the cap 400 than the first plate portion 121. That is, the second plate portion 122 may be disposed farther from the valve 500 than the first plate portion 121. Accordingly, a concave portion may be concavely formed in the central portion of the partition 120 in the first direction. In addition, the concave portion may allow a space through which a second protruding portion 520 of the valve 500 moves to expand.

In addition, the hole 130 may be formed in the second plate portion 122.

The connection portion 123 connects the first plate portion 121 and the second plate portion 122.

In addition, the connection portion 123 may be formed in a cylindrical shape of which a cross section has a ring shape.

In addition, the connection portion 123 may be disposed a predetermined distance from an inner surface of the first body 111. Accordingly, a groove 160 may be formed between the inner surface of the first body 111 and an outer side surface of the connection portion 123. In addition, a guide member 230 of the piston 200 may be disposed in the groove 160 to be movable in the first direction. In this case, the groove 160 may be referred to as a second groove or first guide groove.

In addition, the connection portion 123 may be disposed a predetermined distance from an outer side surface of the first protruding portion 140. Accordingly, a groove 170 may be formed between the outer side surface of the first protruding portion 140 and an inner side surface of the connection portion 123. In addition, a third protruding portion 530 of the valve 500 may be disposed in the groove 170 to be movable in the first direction. In this case, the groove 170 may be referred to as a third groove or second guide groove.

The hole 130 may be formed to pass through the partition 120 in the first direction. Accordingly, the hole 130 may allow the first space SP1 and the second space SP2 to communicate with each other to allow air to flow between the first space SP1 and the second space SP2.

The first protruding portion 140 may allow the hole 130 to extend. For example, the first protruding portion 140 may be formed in a cylindrical shape of which a cross section has a ring shape. Accordingly, the first protruding portion 140 may allow the hole 130 to extend in the first direction. In this case, the first protruding portion 140 may be referred to as a first sleeve or first boss.

In addition, the first protruding portion 140 may be formed to protrude in the first direction. As illustrated in FIGS. 10 and 11, the first protruding portion 140 may be formed to protrude toward the valve 500.

Meanwhile, the first protruding portion 140 may include a groove 141 formed in an inner side surface thereof in the first direction. Specifically, the groove 141 may be concavely formed in the inner side surface in the second direction. In addition, the groove 141 may be disposed in the first direction. In this case, the groove 141 may be referred to as a first groove.

In addition, a cross-sectional area of the groove 141 may increase toward an end portion of the first protruding portion 140. As illustrated in FIG. 10, the groove 141 may be formed in a shape in which a ventilation cross-sectional area decreases in a downward direction due to an inclined surface 141a having a predetermined inclination.

Accordingly, since the valve 500 may move in the first direction due to movement of the piston 200, and a position of an end portion of the second protruding portion 520 is changed in the first protruding portion 140 due to the movement, a ventilation cross-sectional area through which air passes through the hole 130 may also be changed due to the movement of the groove 141 and the second protruding portion 520.

For example, as the second protruding portion 520 is inserted into the first protruding portion 140, since a size of a flow path which is a space through which air flow decreases due to the groove 141, a damping force of the damper 1 increases. In addition, due to the increase in the damping force, a movement speed of the piston 200 decreases. Accordingly, this can help with smooth opening of the glove box G even when a load of the glove box G increases.

Meanwhile, an insertion depth of the second protruding portion 520 into the first protruding portion 140 may be restricted by a position of the guide hole 150 to which the protrusion 550 of the valve 500 is coupled, a size of the guide hole 150 in the first direction, and an elastic force of the elastic support unit 600.

Referring to FIGS. 9 to 11, the plurality of guide holes 150 may be formed in the second body 112. Accordingly, the guide holes 150 may allow the second space SP2 to communicate with the outside.

In addition, the plurality of guide holes 150 may be disposed apart from each other along a circumference of the second body 112. For example, since the second body 112 may be formed in a cylindrical shape, the plurality of guide holes 150 may be disposed apart from each other in a circumferential direction of the second body 112.

In addition, the protrusion 550 of the valve 500 may be disposed in any one of the plurality of guide holes 150.

In this case, sizes of the guide holes 150 in the first direction may be greater than a size of the protrusion 550 in the first direction. Accordingly, the sizes of the guide holes 150 in the first direction may restrict a stroke which is a movement range of the valve 500 in the first direction. That is, the stroke of the valve 500 in the first direction may be restricted due to the sizes of the guide holes 150, to which the protrusion 550 is coupled, in the first direction. In this case, the sizes of the guide holes 150 in the first direction may be referred to as widths of the guide holes 150.

The plurality of guide holes 150 may include first guide holes 150a, second guide holes 150b, and third guide holes 150c having different sizes in the first direction. In addition, each pair of the first guide holes 150a, the second guide holes 150b, and the third guide holes 150c may be symmetrically disposed in the second body 112.

As illustrated in FIGS. 9 and 11, a size W2 of the second guide hole 150b in the first direction may be greater than a size W1 of the first guide hole 150a in the first direction. In addition, a size W3 of the third guide hole 150c in the first direction may be greater than the size W2 of the second guide hole 150b in the first direction. In this case, widths of the first guide holes 150a, the second guide holes 150b, and the third guide holes 150c in the circumferential direction may be the same. In this case, the size W1 of the first guide hole 150a in the first direction may be referred to as a first width. In addition, the size W2 of the second guide hole 150b in the first direction may be referred to as a second width. In addition, the size W3 of the third guide hole 150c in the first direction may be referred to as a third width.

Referring to FIG. 11, a separation distance D1 from the partition 120 to the first guide hole 150a may be smaller than a separation distance D2 from the partition 120 to the second guide hole 150b. In addition, a separation distance D3 from the partition 120 to the third guide hole 150c may be greater than the separation distance D2 from the partition 120 to the second guide hole 150b. In this case, a reference of the separation distance may be the first plate portion 121 of the partition 120.

In this case, an upper end of the first guide hole 150a may be disposed to overlap a lower end of the second guide hole 150b in the circumferential direction. In addition, an upper end of the second guide hole 150b may be disposed to overlap a lower end of the third guide hole 150c in the circumferential direction. That is, since a section in which the first guide hole 150a, the second guide hole 150b, and the third guide hole 150c overlap each other in the circumferential direction is formed, even when the load of the glove box G corresponds to a marginal load in a range from a low load to a high load of the glove box G, the damper 1 can easily cope with the load of the glove box G.

Accordingly, the protrusion 550 of the valve 500 may be coupled to any one of the first guide hole 150a, the second guide hole 150b, and the third guide hole 150c according to a use so that the valve 500 of the damper 1 is used for a proper load within the range between the low load and the high load of the glove box G.

For example, when the glove box G has a low load, the protrusion 550 may be coupled to the first guide hole 150a. Alternatively, when the glove box G has a middle load, the protrusion 550 may be coupled to the second guide hole 150b. Alternatively, when the glove box G has a high load, the protrusion 550 may be coupled to the third guide hole 150c. In this case, ranges of the low load, the middle load, and the high load may be provided as values of predetermined ranges.

When only the first guide hole 150a and the second guide hole 150b are provided as the plurality of guide holes 150, the first guide hole 150a may be used for the low load, and the second guide hole 150b may be used for the high load.

Figure 12:
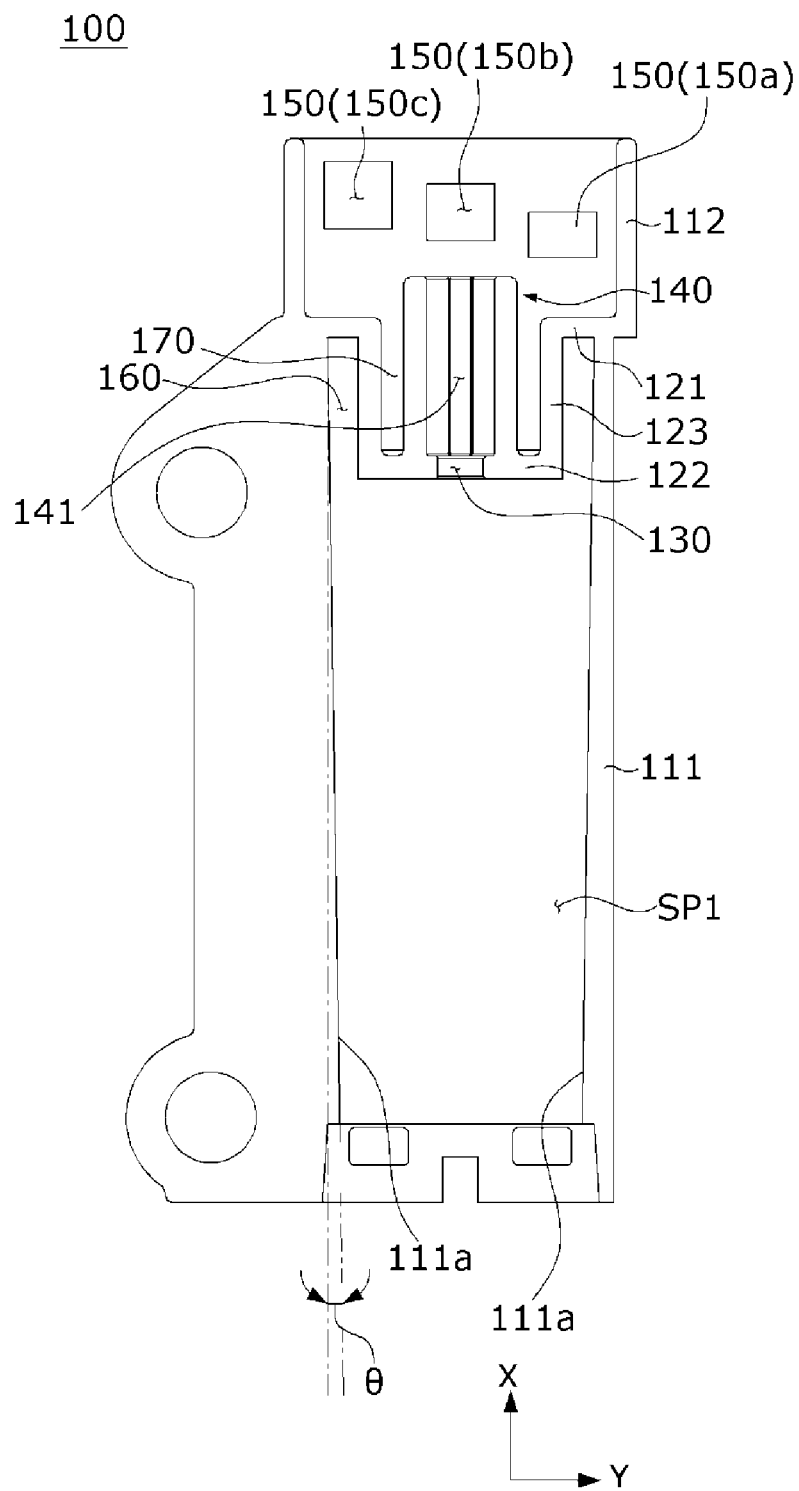
FIG. 12 is a cross-sectional view illustrating a modified example of the cylinder disposed in the damper for a glove box according to the first embodiment.

FIG. 12 is a cross-sectional view illustrating a modified example of the cylinder disposed in the damper for a glove box according to the first embodiment.

Referring to FIG. 12, a space formed in the cylinder 100 may also be formed in a tapered shape. Specifically, the space may be formed in a tapered shape of which a cross-sectional area decreases from one end to the other end of the cylinder 100. Accordingly, the inner surface of the cylinder 100 may include an inclined surface 111a having a predetermined inclination angle θ in the first direction. In this case, the inclined surface 111a may be formed in the first space SP1.

Accordingly, as the piston 200 moves in a direction in which the cap 400 is disposed, a friction force between the sealing member 300 disposed on the piston 200 and the inclined surface 111a may increase, and a movement speed of the piston 200 may gradually decrease. In addition, a decrease in the movement speed may assist with smooth opening of the glove box G.

An example of the inclined surface 111a formed on the entirety of the inner surface of the first body 111 is illustrated in FIG. 12, but the present invention is not necessarily limited thereto. For example, the inclined surface 111a may be formed on a part of the inner surface of the first body 111. Specifically, the inclined surface 111a may also be formed at only a front side of the inner surface of the first body 111.

The piston 200 may move along the inner surface of the first body 111 in the first space SP1 in the first direction in conjunction with movement of the cover CB. Accordingly, a pressure difference may be generated between the inside and the outside of the cylinder 100, and a position of the valve 500 may be changed due to the pressure difference.

The piston 200 may include a piston body 210, a rod 220 formed to protrude from a lower surface of the piston body 210 in the first direction, and the guide member 230 formed to protrude from an upper surface of the piston body 210 in the first direction. In this case, a protruding direction of the rod 220 may be opposite to a protruding direction of the guide member 230.

The piston body 210 may move along the inner surface of the first body 111 in the first direction.

In addition, the piston body 210 may be formed in a disc shape.

In addition, a groove may be concavely formed in an outer circumferential surface of the piston body 210 in the second direction, and the sealing member 300 may be disposed in the groove.

The rod 220 may be integrally formed with the piston body 210 and formed to protrude from one surface of the piston body 210 toward the cap 400 in the first direction. In this case, the rod 220 may be provided as a rectangular member of which a length is greater than a width.

In addition, an end portion of the rod 220 may be exposed to the outside. In addition, the end portion of the rod 220 may be hinge-coupled to the glove box G.

Accordingly, the piston rod 220 may move linearly in conjunction with rotation of the glove box G. In addition, a pressure difference may be generated between the inside and the outside of the cylinder 100 due to the piston body 210 which moves in conjunction with movement of the piston rod 220.

Accordingly, an opening speed of the glove box G may be changed due to a movement speed of the piston 200.

The guide member 230 may be disposed in the groove 160 formed between the inner surface of the first body 111 and the outer side surface of the connection portion 123. Specifically, the guide member 230 may be movably disposed in the groove 160.

In addition, the guide member 230 may be formed in a cylindrical shape of which a cross section has a ring shape but is not necessarily limited thereto. For example, the guide member 230 may be provided as a plurality of protrusions protruding from the upper surface of the piston body 210 in the first direction. In this case, the plurality of protrusions may be disposed apart from each other in the circumferential direction on the piston body 210. In this case, the guide member 230 may be referred to as a second sleeve or second boss.

The sealing member 300 may be disposed in the groove formed in the piston body 210. In addition, an outer side of the sealing member 300 may be in contact with the inner surface of the first body 111.

In this case, the sealing member 300 may be formed of an elastic material such as rubber. Accordingly, the sealing member 300 may be pressed against the inner surface of the first body 111. In this case, an O-ring may be provided as the sealing member 300.

Meanwhile, a lubricant such as grease may be applied on the inner surface of the cylinder 100. Accordingly, friction between the sealing member 300 and the inner surface of the cylinder 100 may decrease.

The cap 400 may be disposed to cover the opening formed at one end portion of the cylinder 100.

In addition, the cap 400 may include a hole formed to guide movement of the rod 220.

The valve 500 may be disposed in the second space SP2.

In addition, the valve 500 may adjust the damping force of the damper 1 while moving in the first direction due to movement of the piston 200. In this case, the valve 500 may adjust the damping force of the damper 1 using the second protruding portion 520 forming a flow path changed according to an arrangement with respect to the first protruding portion 140.

Figure 13:
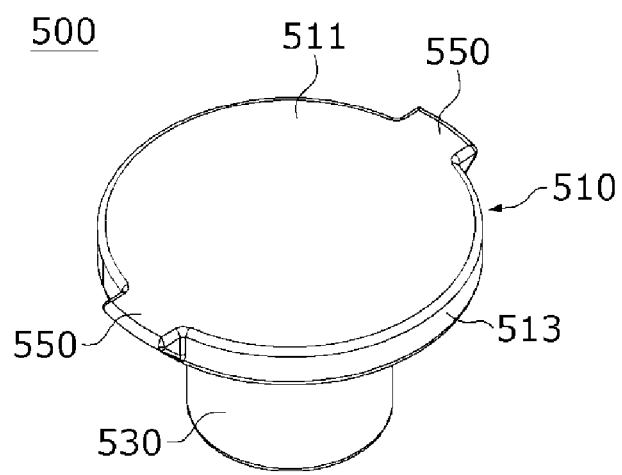
FIG. 13 is a perspective view illustrating a valve of the damper for a glove box according to the first embodiment.
Figure 14:
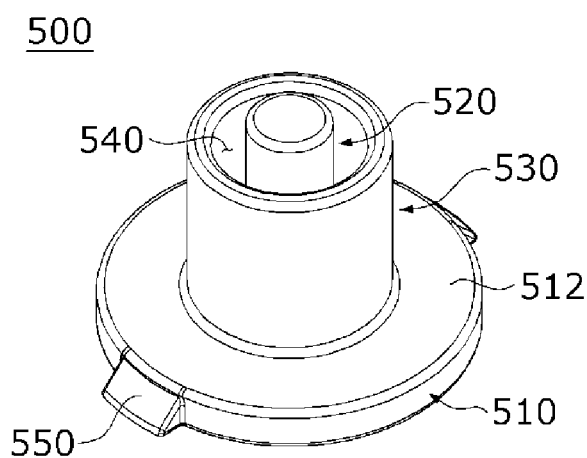
FIG. 14 is a bottom perspective view illustrating the valve of the damper for a glove box according to the first embodiment.
Figure 15:
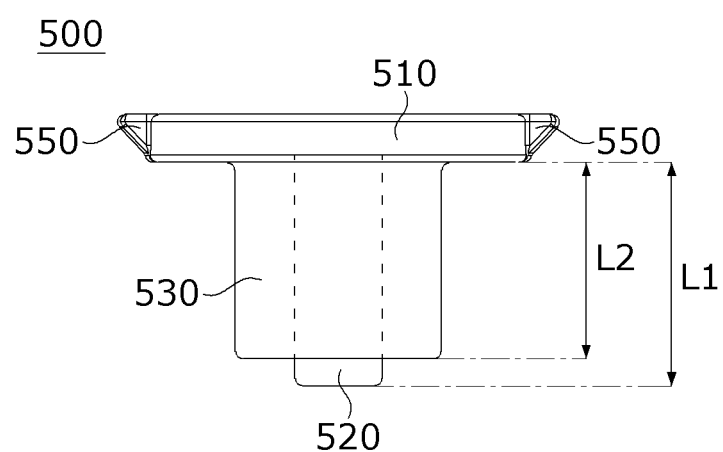
FIG. 15 is a side view illustrating the valve of the damper for a glove box according to the first embodiment.
Figure 16:
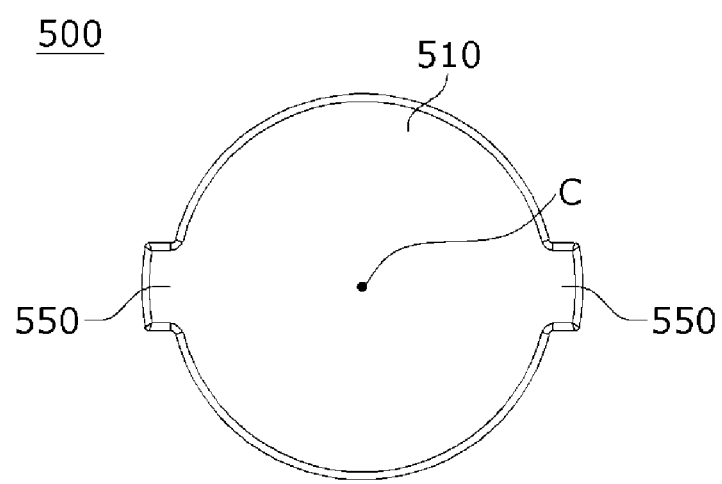
FIG. 16 is a plan view illustrating the valve of the damper for a glove box according to the first embodiment.
Figure 17:
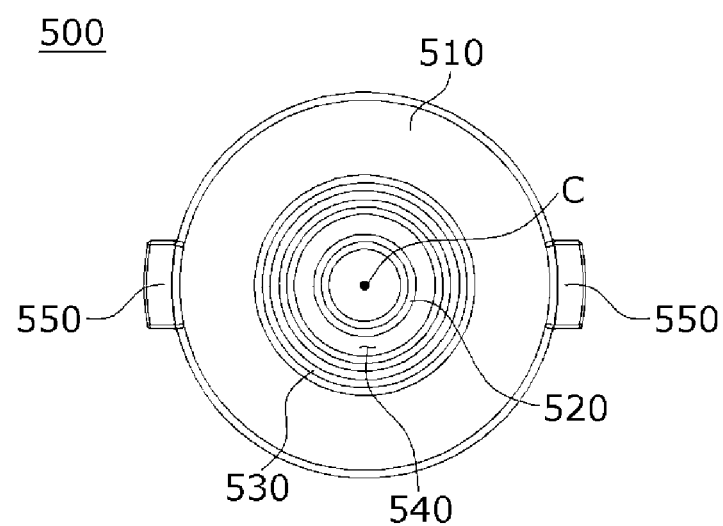
FIG. 17 is a bottom view illustrating the valve of the damper for a glove box according to the first embodiment.

FIG. 13 is a perspective view illustrating the valve of the damper for a glove box according to the first embodiment, FIG. 14 is a bottom perspective view illustrating the valve of the damper for a glove box according to the first embodiment, FIG. 15 is a side view illustrating the valve of the damper for a glove box according to the first embodiment, FIG. 16 is a plan view illustrating the valve of the damper for a glove box according to the first embodiment, and FIG. 17 is a bottom view illustrating the valve of the damper for a glove box according to the first embodiment.

Referring to FIGS. 13 to 17, the valve 500 may include a valve body 510 having a plate shape, the second protruding portion 520 and the third protruding portion 530 which are formed to protrude from the valve body 510 to be disposed in the first protruding portion 140, and the protrusion 550 formed to protrude from an outer side surface 513 of the valve body 510 in the second direction. In this case, the third protruding portion 530 may be disposed to be spaced outward from the second protruding portion 520. Accordingly, a groove 540 may be formed between the second protruding portion 520 and the third protruding portion 530. In this case, the groove 540 may be referred to as a fourth groove or third guide groove.

Meanwhile, the valve body 510, the second protruding portion 520, the third protruding portion 530, and the protrusion 550 may be integrally formed. Accordingly, the valve 500 may be provided as a single part.

The valve body 510 may be formed in a disc shape including an upper surface 511, a lower surface 512, and the outer side surface 513 connecting the upper surface 511 and the lower surface 512.

The second protruding portion 520 may be formed to protrude from the lower surface 512 of the valve body 510 in the first direction. In this case, the second protruding portion 520 may be formed in a cylindrical shape.

In addition, the second protruding portion 520 may be movably disposed in the first protruding portion 140.

Accordingly, the end portion of the second protruding portion 520 may change the size of the flow path while moving in the first protruding portion 140 in the first direction. In addition, the damping force of the damper 1 may be adjusted by the flow path of which the size is changeable.

The third protruding portion 530 may be formed to protrude from the lower surface 512 of the valve body 510 toward the partition 120. In this case, based on the lower surface 512 of the valve body 510, a protruding length L2 of the third protruding portion 530 in the first direction may be smaller than a protruding length L1 of the second protruding portion 520 in the first direction. The protruding length L1 of the second protruding portion 520 in the first direction may be referred to as a first length or first height. In addition, the protruding length L2 of the third protruding portion 530 in the first direction may be referred to as a second length or second height.

In addition, the third protruding portion 530 may be formed in a cylindrical shape of which a cross section has a ring shape. In addition, the third protruding portion 530 may be disposed in the groove 170. Accordingly, a flow path through which air flows may extend through the hole 130. In this case, the third protruding portion 530 may be referred to as a third sleeve or third boss.

The groove 540 may be formed between the second protruding portion 520 and the third protruding portion 530. In addition, the end portion of the first protruding portion 140 may be disposed in the groove 540.

The protrusion 550 may be formed to protrude from the valve body 510 to correspond to the guide hole 150. As illustrated in FIGS. 13 to 17, the protrusion 550 may be formed to protrude from the outer side surface 513 of the valve body 510 in the second direction.

Accordingly, the protrusion 550 may be disposed in the guide hole 150 and used as a component which restricts a movement range of the valve 500 when the valve 500 moves. Specifically, the movement range of the valve 500 may be restricted due to coupling of the protrusion 550 and the guide hole 150 and the size of the guide hole 150 in the first direction.

The elastic support unit 600 may be a member which is in contact with and compressed by the partition 120 of the cylinder 100 due to movement of the piston 200. That is, the elastic support unit 600 may be a member which is pressed by movement of the valve 500 to generate an elastic force. For example, the elastic support unit 600 may be provided as a coil spring.

One side of the spring may be in contact with the lower surface 512 of the valve body 510, and the other side may be in contact with an upper surface 121a of the first plate portion 121. In addition, as the valve 500 moves in the first direction, the spring may be compressed.

In addition, the spring may be disposed outside the third protruding portion 530.

Figure 18:
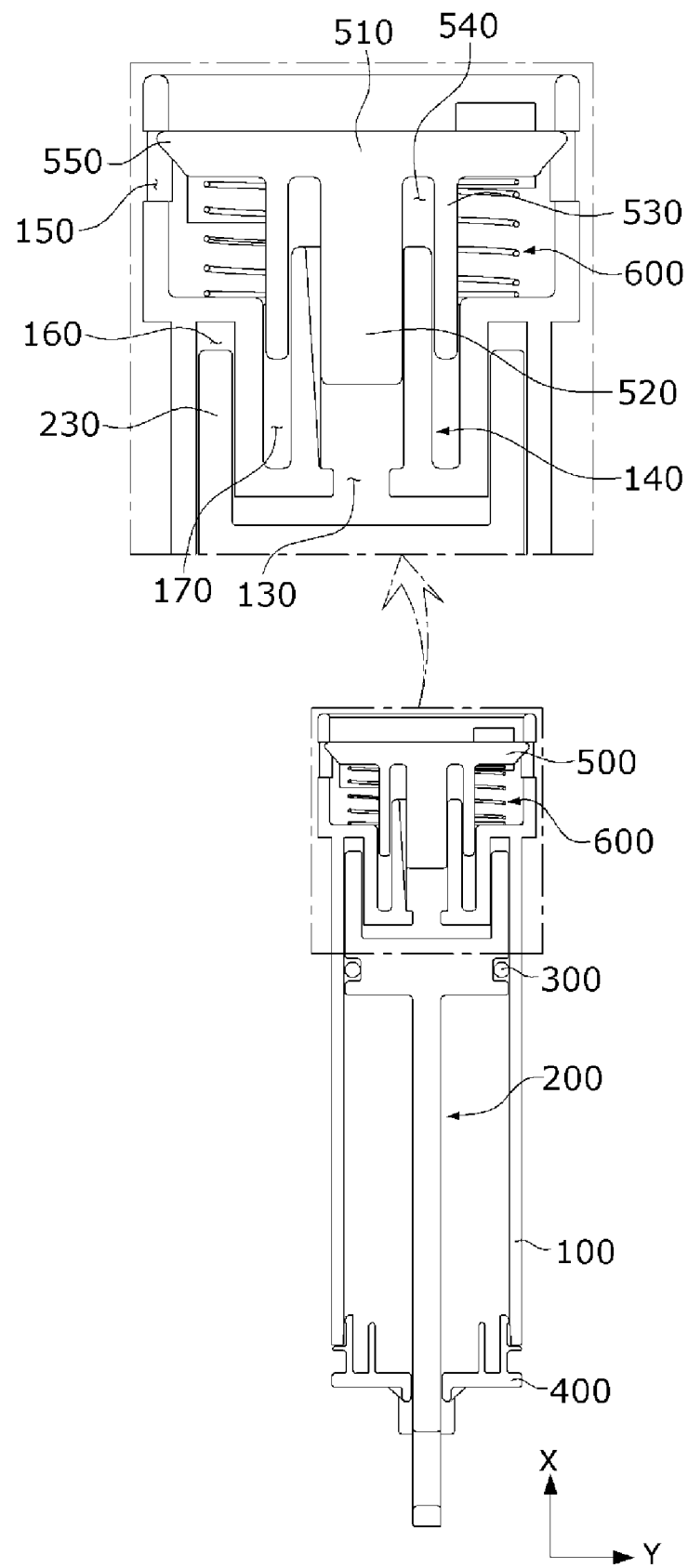
FIGS. 18 and 19 are views illustrating operations of the damper for a glove box according to the first embodiment.
Figure 19:
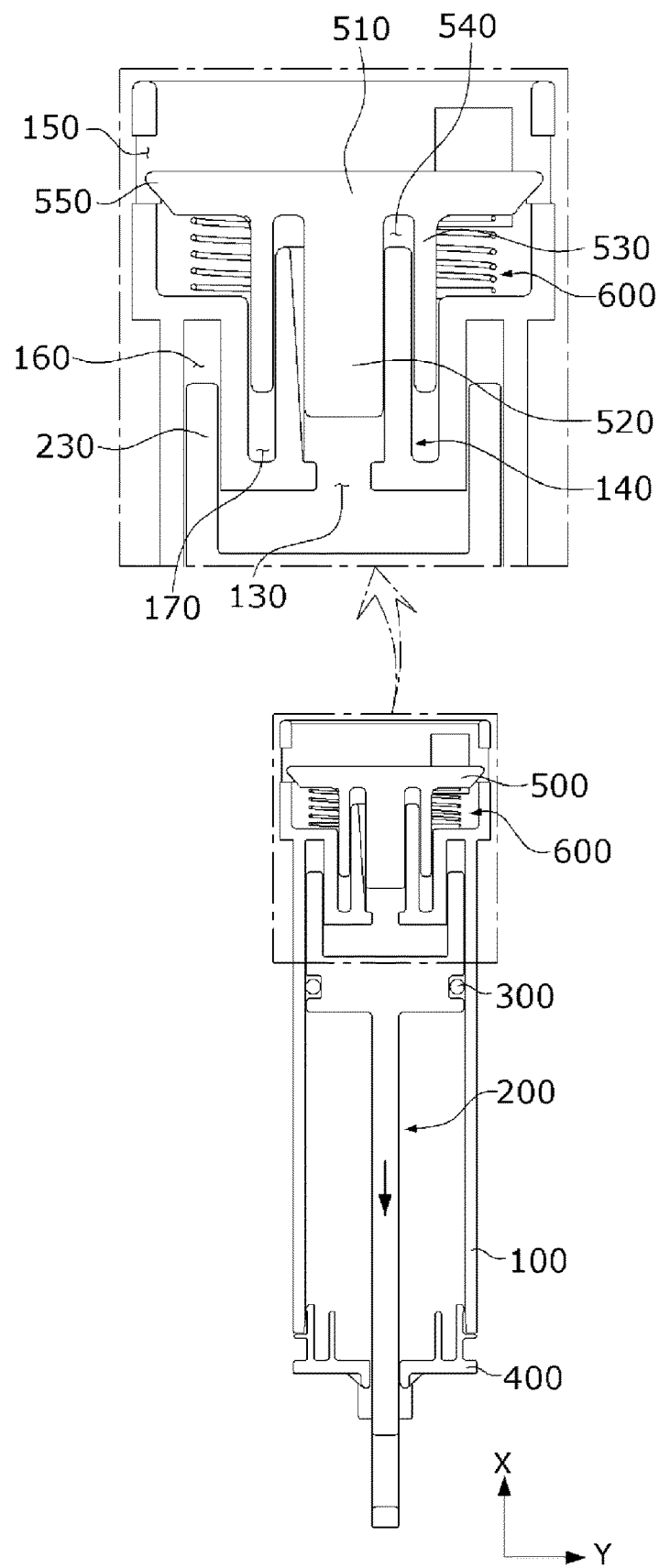

FIGS. 18 and 19 are views illustrating operations of the damper for a glove box according to the first embodiment, wherein FIG. 18 is a view illustrating a position of the valve when the glove box is closed, and FIG. 19 is a view illustrating a position of the valve when the glove box is opened.

Referring to FIGS. 18 and 19, the valve 500 moves due to movement of the piston 200. Accordingly, while the elastic support unit 600 of the valve 500 is in contact with and pressed by the upper surface 121a of the first plate portion 121, the elastic support unit 600 is compressed. In addition, the elastic force of the elastic support unit 600 generated due to the compression of the elastic support unit 600 may be one factor for the generation of the damping force of the damper 1.

Second Embodiment

Figure 20:
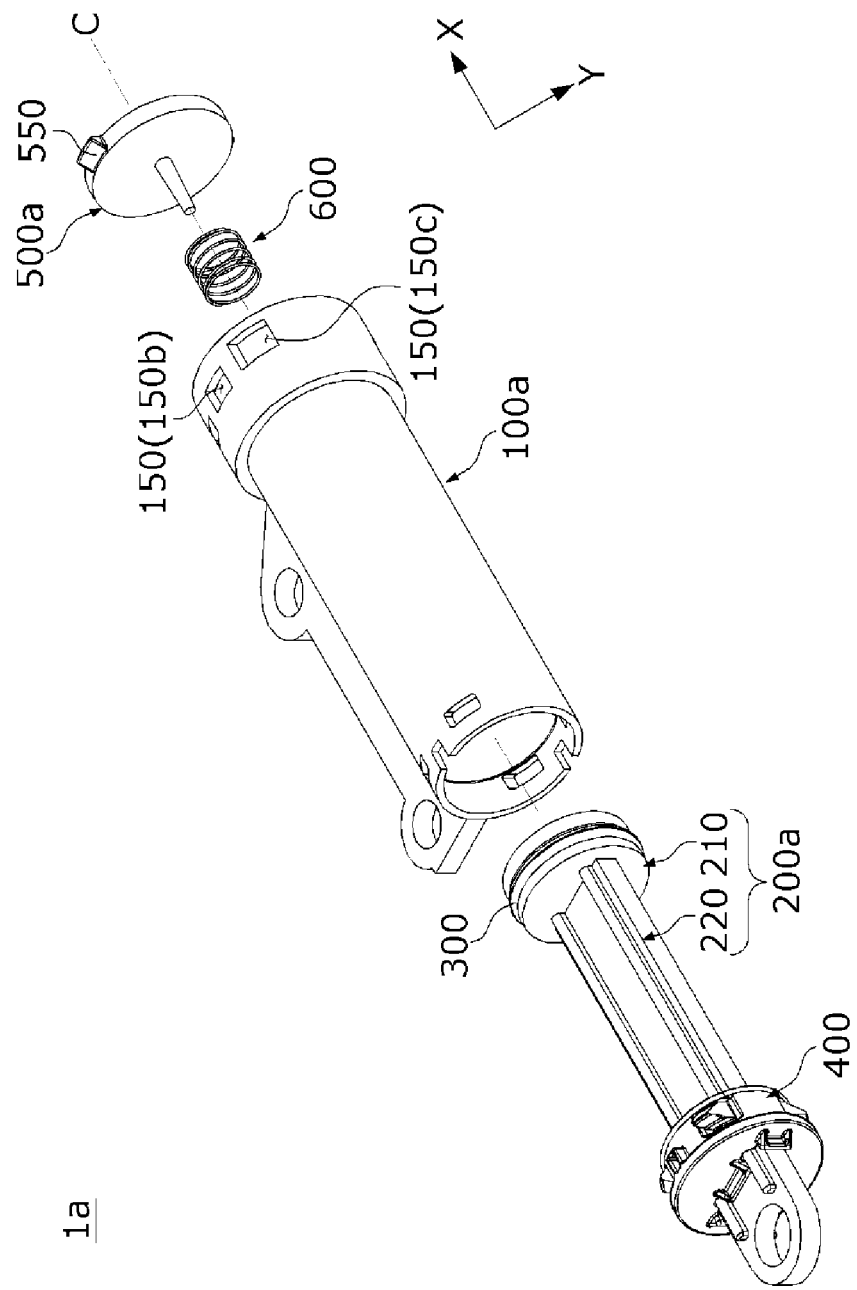
FIG. 20 is an exploded perspective view illustrating a damper for a glove box according to a second embodiment.
Figure 21:
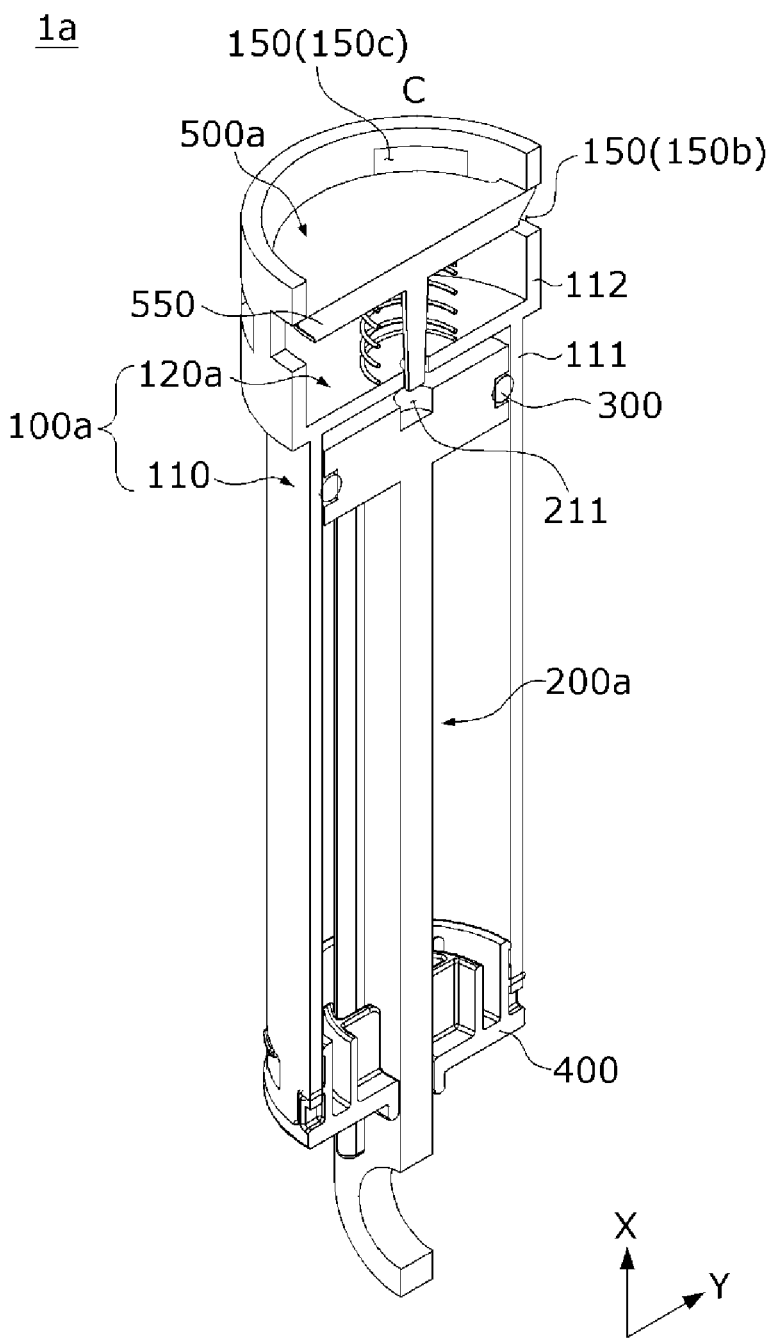
FIG. 21 is a cross-sectional perspective view illustrating the damper for a glove box according to the second embodiment.
Figure 22:
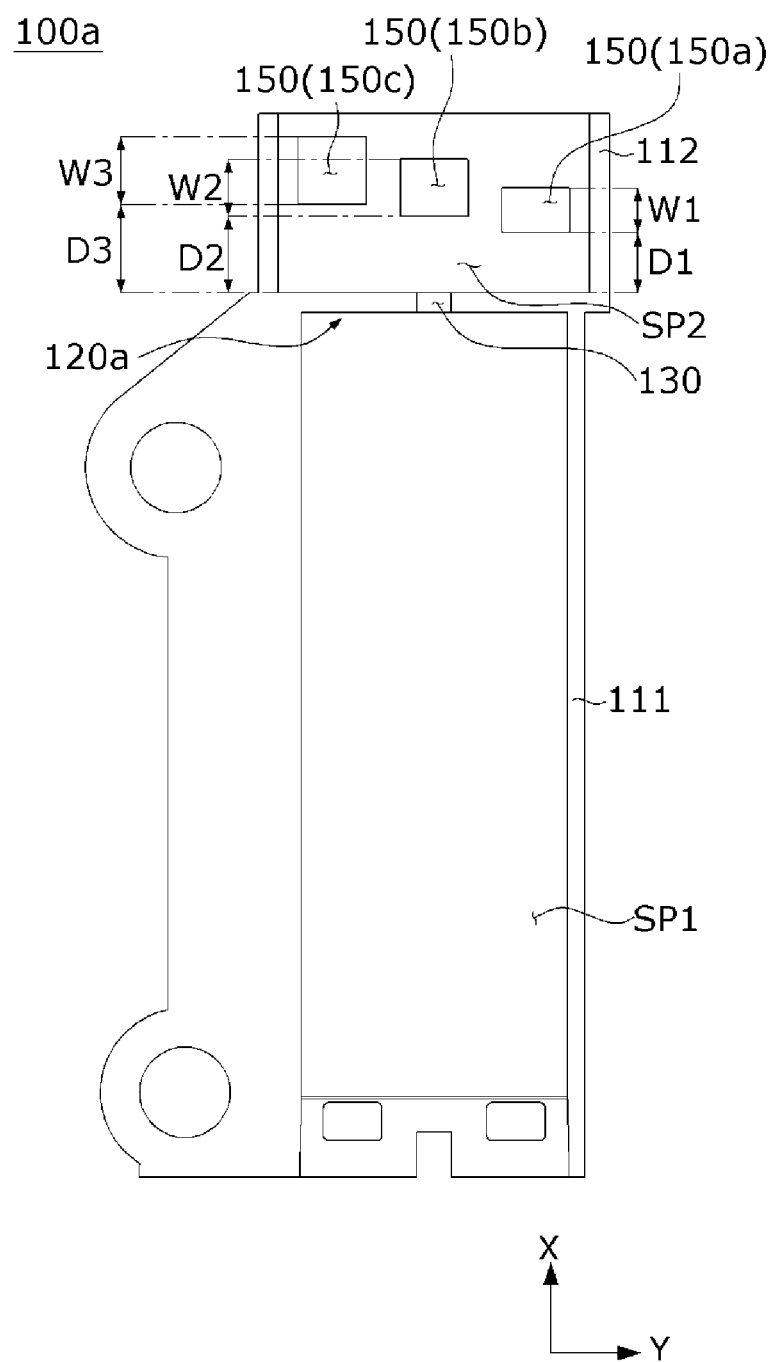
FIG. 22 is a cross-sectional view illustrating a cylinder disposed in the damper for a glove box according to the second embodiment.
Figure 23:
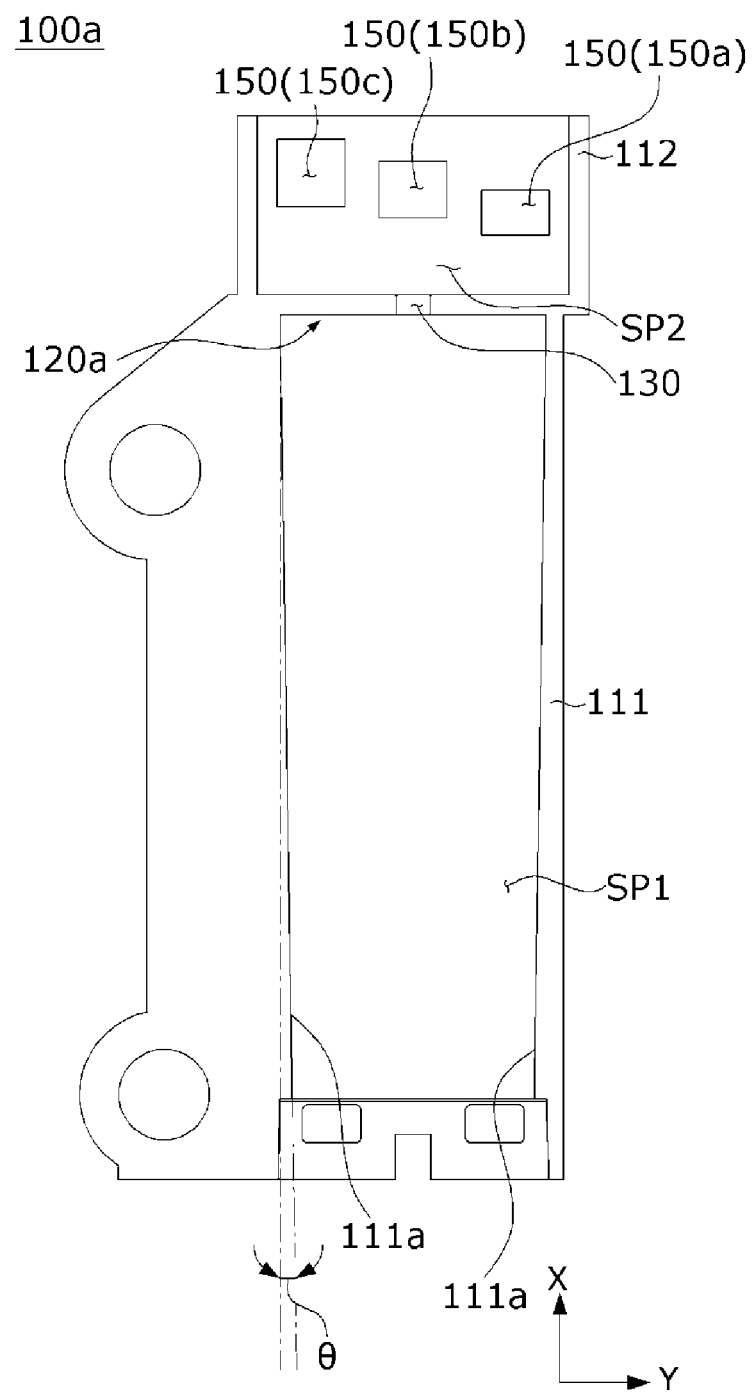
FIG. 23 is a cross-sectional view illustrating a modified example of the cylinder disposed in the damper for a glove box according to the second embodiment.
Figure 24:
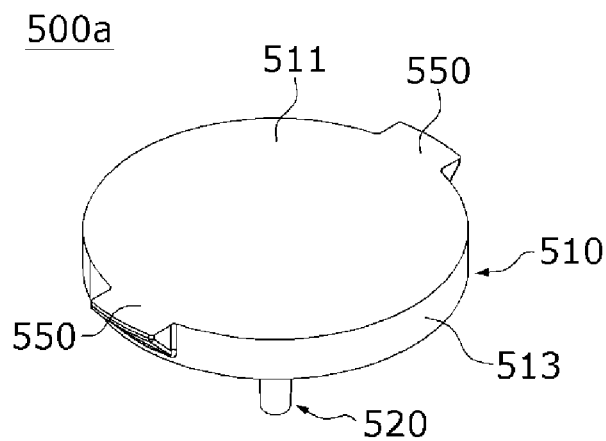
FIG. 24 is a perspective view illustrating a valve of the damper for a glove box according to the second embodiment.
Figure 25:
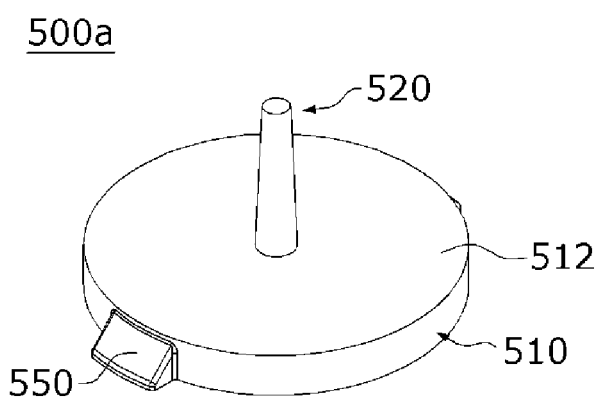
FIG. 25 is a bottom perspective view illustrating the valve of the damper for a glove box according to the second embodiment.
Figure 26:
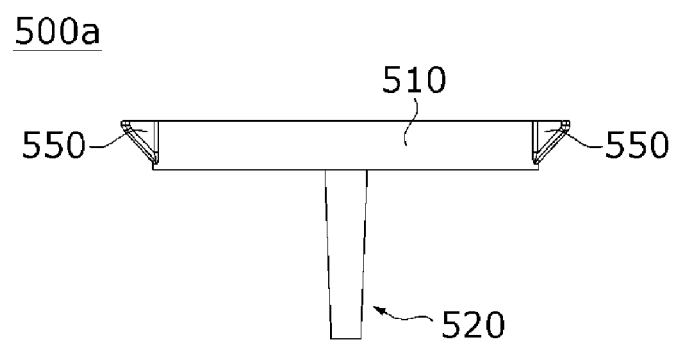
FIG. 26 is a side view illustrating the valve of the damper for a glove box according to the second embodiment.
Figure 27:
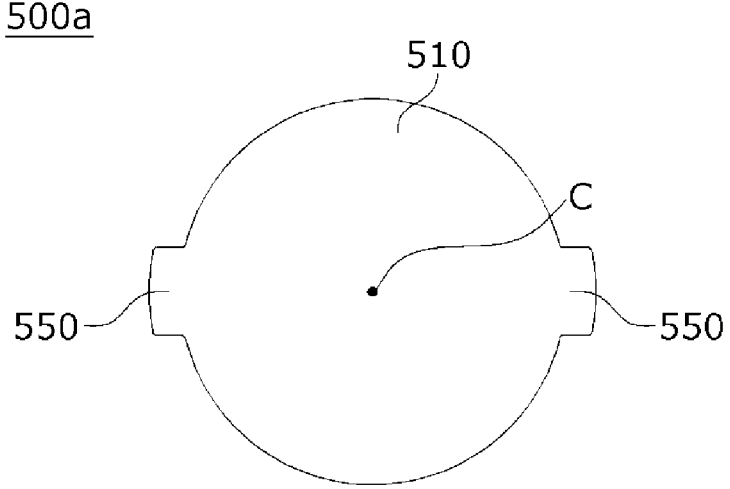
FIG. 27 is a plan view illustrating the valve of the damper for a glove box according to the second embodiment.
Figure 28:
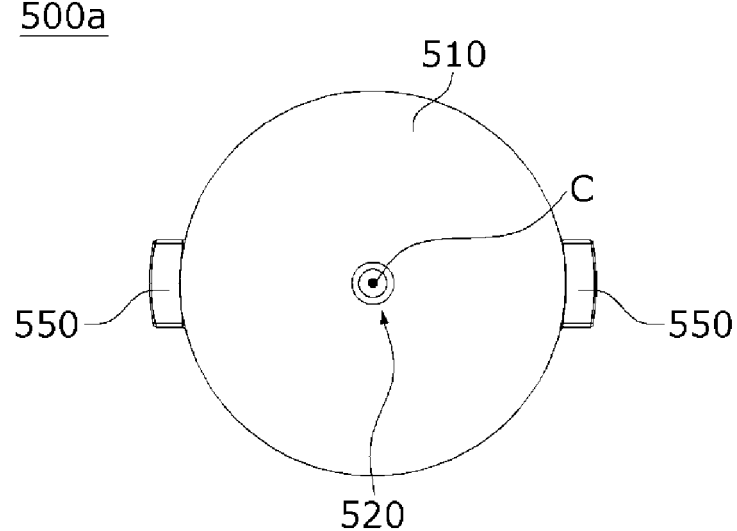
FIG. 28 is a bottom view illustrating the valve of the damper for a glove box according to the second embodiment.

FIG. 20 is an exploded perspective view illustrating a damper for a glove box according to a second embodiment, FIG. 21 is a cross-sectional perspective view illustrating the damper for a glove box according to the second embodiment, and FIG. 22 is a cross-sectional view illustrating a cylinder disposed in the damper for a glove box according to the second embodiment. FIG. 23 is a cross-sectional view illustrating a modified example of the cylinder disposed in the damper for a glove box according to the second embodiment, FIG. 24 is a perspective view illustrating a valve of the damper for a glove box according to the second embodiment, and FIG. 25 is a bottom perspective view illustrating the valve of the damper for a glove box according to the second embodiment. FIG. 26 is a side view illustrating the valve of the damper for a glove box according to the second embodiment, FIG. 27 is a plan view illustrating the valve of the damper for a glove box according to the second embodiment, and FIG. 28 is a bottom view illustrating the valve of the damper for a glove box according to the second embodiment.

Referring to FIGS. 5 to 17 and 20 to 28, there are differences in the shapes and the like of the cylinder, the piston, and the valve between the damper for a glove box according to the first embodiment and the damper for a glove box according to the second embodiment.

In the description of the damper for a glove box according to the second embodiment, the same reference symbols are assigned to components which are the same as those of the damper for a glove box according to the first embodiment, and detailed descriptions thereof will be omitted.

Referring to FIGS. 20 to 28, a damper 1a according to the second embodiment may include a cylinder 100a, a piston 200a movably disposed in a space formed in the cylinder 100a, a sealing member 300 disposed between an inner surface of the cylinder 100a and the piston 200a, a cap 400 disposed to cover an opening disposed at one side of the cylinder 100a, a valve 500a disposed at one side of the space, and an elastic support unit 600 which is in contact with a partition 120a of the cylinder 100a and elastically supports the valve 500a.

The cylinder 100a may include a cylinder body 110 in which a space is formed, the partition 120a which divides the space into a first space SP1 and a second space SP2, and a plurality of guide holes 150 formed in the cylinder body 110 to allow the second space SP2 to communicate with the outside. When compared to the cylinder 100 described in the first embodiment, there is a difference in a shape of the partition of the cylinder 100a.

The partition 120a may be disposed in the cylinder body 110. In addition, a hole 130 may be disposed in a central portion of the partition 120a.

The partition 120a may be formed in a disc shape in which the hole 130 is formed in the central portion. In addition, the partition 120a may be formed in a second direction. In this case, the partition 120a may be in contact with the elastic support unit 600 to allow the elastic support unit 600 to elastically support the valve 500a.

Referring to FIG. 23, the cylinder 100a may also include an inclined surface 111a having a predetermined inclination angle θ in a first direction.

The piston 200a may move along an inner surface of the first body 111 in the first space SP1 in the first direction in conjunction with movement of a cover CB.

The piston 200a may include a piston body 210 and a rod 220 formed to protrude from a lower surface of the piston body 210 in the first direction. When compared to the piston 200 described in the first embodiment, there is a difference in that a guide member 230 is omitted in the piston 200a.

In addition, a groove 211 corresponding to a second protruding portion 520 of the valve 500a may be formed in the piston body 210.

As illustrated in FIG. 21, the groove 211 may be concavely formed in an upper surface of the piston body 210 in the first direction. In addition, the groove 211 may be formed to overlap the second protruding portion 520 in the first direction. Accordingly, even when a glove box G is closed, interference between the piston 200a and the valve 500a does not occur due to the groove 211.

In this case, the upper surface of the piston body 210 may be a surface disposed to face the partition 120a.

The valve 500a may be disposed in the second space SP2. In addition, the valve 500a may adjust a damping force of the damper 1a while moving in the first direction due to movement of the piston 200. In this case, the valve 500a may adjust the damping force of the damper 1a through a size of the hole 130 changed according to a layout of the hole 130 and the second protruding portion 520.

The valve 500a may include a valve body 510 having a plate shape, the second protruding portion 520 formed to protrude from the valve body 510 so that an end portion thereof is disposed in the hole 130, and a protrusion 550 formed to protrude from an outer side surface 513 of the valve body 510 in the second direction. Accordingly, the end portion of the second protruding portion 520 may be disposed to overlap the partition 120a in the second direction.

In this case, the second protruding portion 520 may be formed in a shape of which a cross-sectional area decreases toward the end portion thereof. For example, the second protruding portion 520 may be formed in a tapered shape.

Accordingly, the end portion of the second protruding portion 520 may be disposed in the hole 130 to have a predetermined volume. In this case, since the valve 500a may move in the first direction due to movement of the piston 200a, a volume of the second protruding portion 520 in the hole 130 may change.

For example, since a size of a flow path which is a space through which air flows decreases as the volume of the second protruding portion 520 in the hole 130 decreases, the damping force of the damper 1a increases. In addition, due to the increase in the damping force, a movement speed of the piston 200a decreases. Accordingly, this may help with smooth opening of the glove box G even when a load of the glove box G increases.

The elastic support unit 600 may be provided as a coil spring having one side in contact with the valve body 510 and the other side in contact with the partition 120a. In this case, the spring may be disposed outside the second protruding portion 520.

Figure 29:
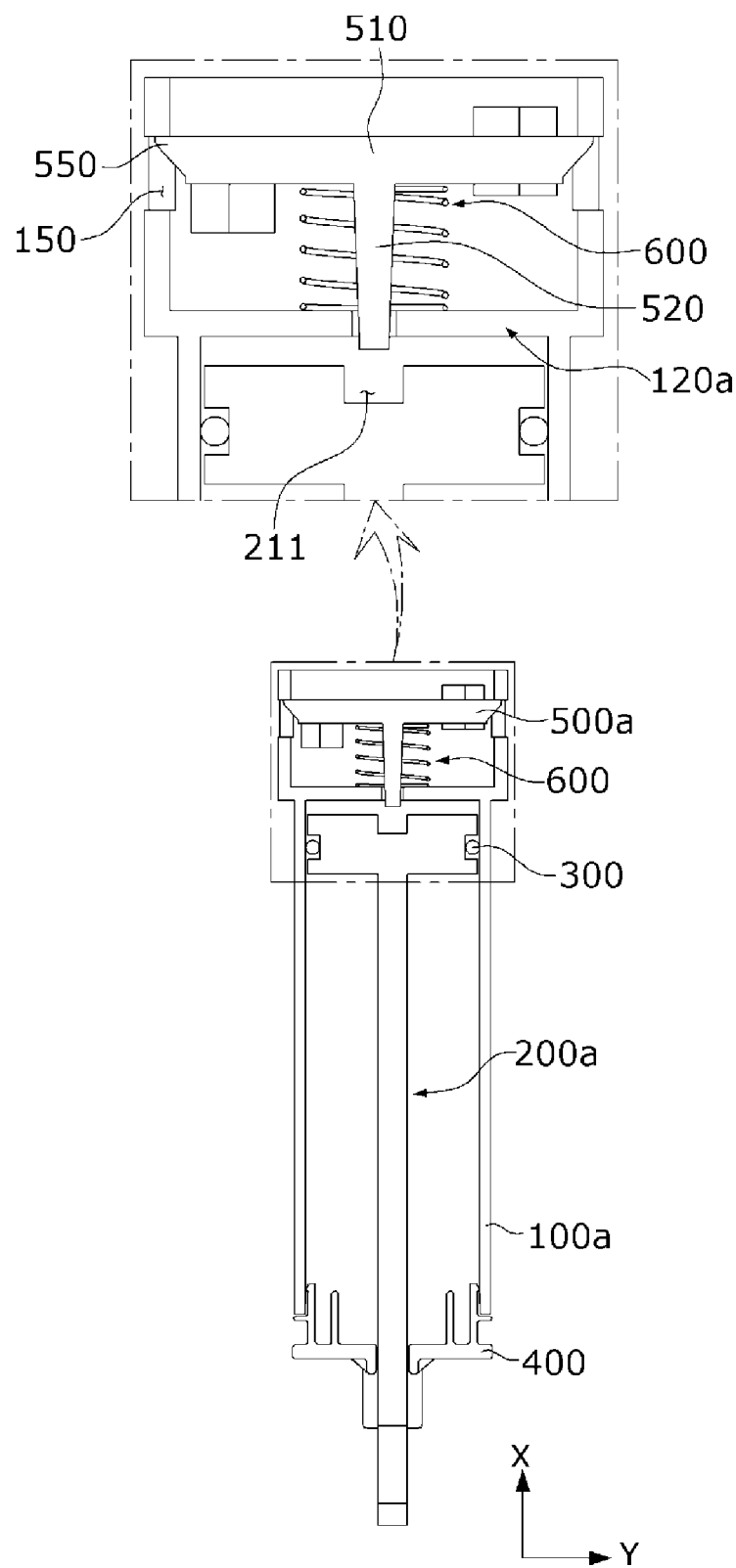
FIGS. 29 and 30 are views illustrating operations of the damper for a glove box according to the second embodiment.
Figure 30:
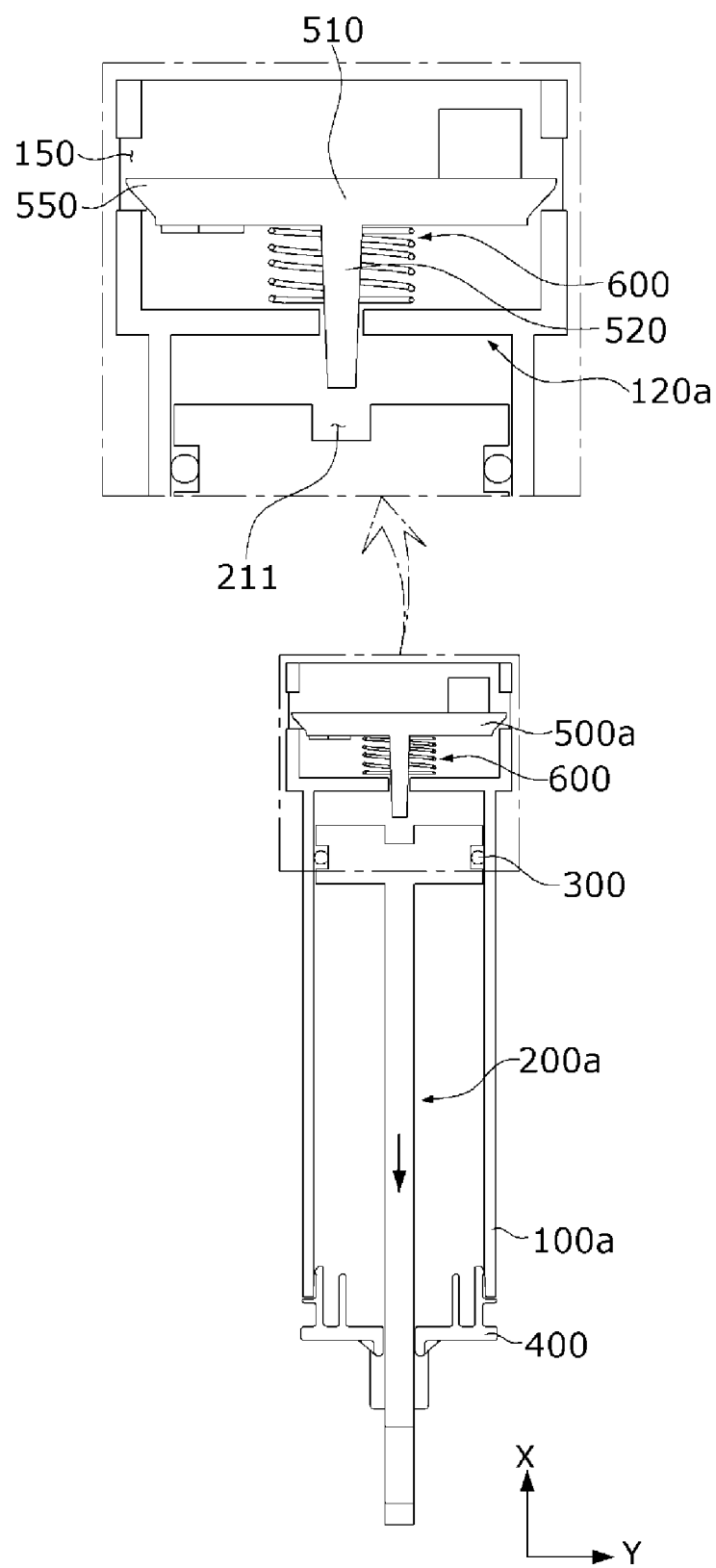

FIGS. 29 and 30 are views illustrating operations of the damper for a glove box according to the second embodiment, wherein FIG. 29 is a view illustrating a position of the valve when the glove box is closed, and FIG. 30 is a view illustrating a position of the valve when the glove box is opened.

Referring to FIGS. 29 and 30, the valve 500a moves due to movement of the piston 200a. Accordingly, the elastic support unit 600 is compressed while in contact with and pressed by the partition 120a. In addition, the elastic force of the elastic support unit 600 generated due to the compression of the elastic support unit 600 may be one factor in generation of the damping force of the damper 1.

According to embodiments, movement of a cover can be controlled at a constant speed regardless of a load applied to the cover of a glove box using a damper for a glove box. Accordingly, the cover can smoothly and stably open the glove box.

Various useful advantages and effects of the embodiments are not limited to the above-described contents and will be more easily understood from descriptions of the specific embodiments.

While the present invention has been described above with reference to exemplary embodiments, it may be understood by those skilled in the art that various modifications and changes of the present invention may be made within a range not departing from the spirit and scope of the present invention defined by the appended claims. In addition, it should be interpreted that differences related to modifications and changes fall within the scope of the present invention defined by the appended claims.

What is claimed is:

1. A damper for a glove box, comprising:
a cylinder including a cylinder body defining a space therein, a partition that divides the space into a first space and a second space and in which a hole is disposed, and guide holes disposed in the cylinder body to communicate with the second space;
a piston disposed in the first space and configured to be movable in a first direction;
a valve disposed in the second space; and
an elastic support unit disposed in the second space to elastically support the valve,
wherein the guide holes include a first guide hole and a second guide hole disposed apart from each other along a circumference of the cylinder body, and
a protrusion of the valve is disposed in one of the first guide hole and the second guide hole,
wherein a first separation distance between the partition and the first guide hole is smaller than a second separation distance between the partition and the second guide hole.

2. The damper of claim 1, wherein an upper end of the first guide hole overlaps a lower end of the second guide hole in a circumferential direction.

3. The damper of claim 1, wherein a size of the first guide hole in the first direction is smaller than a size of the second guide hole in the first direction.

4. The damper of claim 3, wherein:
the cylinder body includes a third guide hole;
a size of the third guide hole in the first direction is greater than the size of the second guide hole in the first direction; and
a third separation distance from the partition to the third guide hole is greater than the second separation distance.

5. The damper of claim 4, wherein an upper end of the second guide hole overlaps a lower end of the third guide hole in a circumferential direction.

6. The damper of claim 1, wherein the partition includes:
a first plate portion;
a second plate portion spaced apart from the first plate portion in the first direction;
a connection portion connecting the first plate portion to the second plate portion; and
a first protruding portion that protrudes from the second plate portion toward the valve to allow the hole to extend.

7. The damper of claim 6, wherein the first protruding portion includes a groove disposed in an inner side surface thereof.

8. The damper of claim 7, wherein a cross-sectional area of the groove increases toward an end portion of the first protruding portion.

9. The damper of claim 7, wherein the valve includes:
a valve body having a plate shape; and
a second protruding portion that protrudes from the valve body and is disposed in the first protruding portion,
wherein the protrusion is formed to protrude from an outer side surface of the valve body.

10. The damper of claim 9, wherein:
the valve includes a third protruding portion that protrudes from the valve body; and
the third protruding portion is disposed between the connection portion and the first protruding portion.

11. The damper of claim 10, wherein a length of the second protruding portion in the first direction is greater than a length of the third protruding portion in the first direction.

12. The damper of claim 7, wherein the piston includes:
a piston body;
a rod that protrudes from a lower surface of the piston body in the first direction; and
a guide member that protrudes from an upper surface of the piston body in the first direction,
wherein the piston body, the rod, and the guide member are integral, and
the guide member is disposed between the connection portion and an inner side surface of the cylinder body.

13. The damper of claim 1, wherein:
the partition has a plate shape and the hole is disposed in a central portion of the partition;
the valve includes a valve body having a plate shape and a protruding portion that protrudes from the valve body so that an end portion of the protruding portion is disposed in the hole;
the protruding portion has a cross-sectional area that decreases toward the end portion thereof; and
the protrusion protrudes from an outer side surface of the valve body.

14. The damper of claim 13, wherein the piston includes:
a piston body; and
a rod that protrudes from a lower surface of the piston body in the first direction,
wherein the piston body includes a groove corresponding to the protruding portion.

15. The damper of claim 1, wherein:
the cylinder includes an inclined surface disposed in the first space; and
a cross-sectional area of the first space in which the inclined surface is disposed decreases away from the partition.

16. A glove box comprising:
a glove box body and a cover that define an accommodation space therebetween; and
a damper for the glove box configured to adjust a movement speed of the glove box body,
wherein the glove box body is rotatably disposed in a dashboard of a vehicle,
the damper includes a cylinder including a cylinder body defining a space therein, a partition that divides the space into a first space and a second space and in which a hole is disposed, and guide holes disposed in the cylinder body to communicate with the second space, a piston disposed in the first space and configured to be movable in a first direction, a valve disposed in the second space, and an elastic support unit disposed in the second space to elastically support the valve,
the guide holes include a first guide hole and a second guide hole disposed apart from each other along a circumference of the cylinder body, and
a protrusion of the valve is disposed in one of the first guide hole and the second guide hole,
wherein a first separation distance between the partition and the first guide hole is smaller than a second separation distance between the partition and the second guide hole.

17. The glove box of claim 16, wherein the partition includes:
a first plate portion;
a second plate portion spaced apart from the first plate portion in the first direction;
a connection portion connecting the first plate portion to the second plate portion; and
a first protruding portion that protrudes from the second plate portion toward the valve to allow the hole to extend,
wherein the first protruding portion includes a groove disposed in an inner side surface thereof and the groove has a cross-sectional area that increases toward an end portion thereof.

18. The glove box of claim 17, wherein:
the partition has a plate shape and the hole is disposed in a central portion of the partition;
the valve includes a valve body having a plate shape and a second protruding portion that protrudes from the valve body so that an end portion thereof is disposed in the hole;
the second protruding portion has a cross-sectional area that decreases toward the end portion thereof; and
the protrusion protrudes from an outer side surface of the valve body.

* * * * *